US008755288B2

(12) United States Patent
Akahane et al.

(10) Patent No.: US 8,755,288 B2
(45) Date of Patent: Jun. 17, 2014

(54) NETWORK SYSTEM, LAYER 2 SWITCH, AND METHOD OF DETECTING OCCURRENCE OF A FAULT IN A NETWORK

(75) Inventors: Shinichi Akahane, Hachioji (JP); Teruo Kaganoi, Yokohama (JP); Tetsuya Nagata, Yokohama (JP)

(73) Assignee: Alaxala Networks Corporation, Kawasaki (JP)

( * ) Notice: Subject to any disclaimer, the term of this patent is extended or adjusted under 35 U.S.C. 154(b) by 133 days.

(21) Appl. No.: 13/191,981

(22) Filed: Jul. 27, 2011

(65) Prior Publication Data

US 2012/0039184 A1 Feb. 16, 2012

(30) Foreign Application Priority Data

Aug. 11, 2010 (JP) ................................. 2010-179970

(51) Int. Cl.
*H04L 12/26* (2006.01)
(52) U.S. Cl.
CPC ............... *H04L 43/00* (2013.01); *H04L 43/50* (2013.01)
USPC ........................................................ 370/249
(58) Field of Classification Search
USPC .................. 370/241, 242, 244, 245, 248, 249
See application file for complete search history.

(56) References Cited

U.S. PATENT DOCUMENTS

| | | | |
|---|---|---|---|
| 2004/0236855 A1* | 11/2004 | Peles | 709/227 |
| 2005/0259589 A1* | 11/2005 | Rozmovits et al. | 370/249 |
| 2006/0045021 A1* | 3/2006 | Deragon et al. | 370/249 |
| 2007/0086333 A1* | 4/2007 | Doukai et al. | 370/228 |
| 2007/0115838 A1* | 5/2007 | Dunbar | 370/249 |
| 2008/0062874 A1* | 3/2008 | Shimadoi | 370/232 |
| 2008/0267080 A1* | 10/2008 | Sultan et al. | 370/248 |
| 2009/0141641 A1 | 6/2009 | Akahane et al. | |
| 2011/0261706 A1* | 10/2011 | Fujiwara et al. | 370/252 |

FOREIGN PATENT DOCUMENTS

| | | | |
|---|---|---|---|
| JP | 63-280538 A | 11/1988 | |
| JP | 2003-078545 A | 3/2003 | |
| JP | 2003-289310 A | 10/2003 | |
| JP | 2003-304264 A | 10/2003 | |

OTHER PUBLICATIONS

Foschiano, M.; Cisco Systems UniDirectional Link Detection (UDLD) Protocol; Network Working Group, Request for Comments: 5171; Apr. 2008; pp. 1-13.
Notice of Reasons for Rejection received in JP2010-179970 dated Jul. 9, 2013.
European Patent Office extended search report on application 11177118.4 mailed Mar. 27, 2014; 8 pages.

\* cited by examiner

*Primary Examiner* — Anh-Vu Ly
*Assistant Examiner* — Gustavo Lopez-Vargas
(74) *Attorney, Agent, or Firm* — Foley & Lardner LLP

(57) ABSTRACT

A network system comprises a first communication device having a first address connected, using a network, to a second communication device having a second address. The first communication device includes a monitor frame transmitter configured to generate a monitor frame including the second address as a destination address and the first address as a source address, and to output the generated monitor frame to the network; and a monitoring-response frame monitor configured to monitor reception of a monitoring-response frame sent back from the second communication device. The second communication device includes: a monitoring-response frame transmitter configured to, in response to reception of the monitor frame, generate the monitoring-response frame by exchanging the destination address in the received monitor frame for a source address and the source address in the received monitor frame for a destination address, and output the generated monitoring-response frame to the network.

13 Claims, 13 Drawing Sheets

IN NORMAL STATE

IN FAULT STATE

LHC (LHCB) FRAME FORMAT

PORT STATUS MANAGEMENT TABLE
(IN THE STATE THAT PORT P11 HAS BEEN SET
AS MONITORING OBJECT PORT)

| PORT | LOGICAL STATUS | MONITORING STATUS | MONITORING TIME LIMIT | MONITORING TIMER |
|---|---|---|---|---|
| P11 | BLK | RECOVERY MONITORING | 10ms | 0ms |
| P12 | FWD | FAULT MONITORING | 50ms | 1ms |
| ⋮ | ⋮ | ⋮ | ⋮ | ⋮ |
| P1n | FWD | FAULT MONITORING | 100s | 2ms |

PORT STATUS MANAGEMENT TABLE (IN FAULT STATE)

| PORT | LOGICAL STATUS | MONITORING STATUS | MONITORING TIME LIMIT | MONITORING TIMER |
|---|---|---|---|---|
| P11 | BLK | RECOVERY MONITORING | 10ms | 10ms |
| P12 | FWD | FAULT MONITORING | 50ms | 1ms |
| ⋮ | ⋮ | ⋮ | ⋮ | ⋮ |
| P1n | FWD | FAULT MONITORING | 100s | 2ms |

NETWORK SYSTEM, LAYER 2 SWITCH, AND METHOD OF DETECTING OCCURRENCE OF A FAULT IN A NETWORK

CROSS-REFERENCE TO RELATED APPLICATIONS

The present application claims the priority based on Japanese Patent Application No. 2010-179970 filed on Aug. 11, 2010, the disclosure of which is hereby incorporated by reference in its entirety.

BACKGROUND OF THE INVENTION

1. Field of the Invention

The present invention relates to detection of occurrence of a fault in a network.

2. Description of the Related Art

In a system configuration where two communication devices (for example, layer 2 switches) are connected with each other via a network, two bidirectional paths (communication paths) are established between the two communication devices. When a fault occurs in one of the two paths (called "unidirectional path fault"), various problems arise; for example, frame looping on the network. UDLD (Unidirectional Link Detection) protocol has been proposed for detection of such a unidirectional path fault (Cisco System Unidirectional Link Detection (UDLD) Protocol (RFC:5171), Cisco Systems, April 2008, Retrieved from the Internet; on Jun. 20, 2010).

According to the UDLD protocol, each of the two communication devices sends a link health check frame to the other communication device and detects the occurrence of a unidirectional link fault based on reception or non-reception of a link health check return frame sent back from the other communication device.

The UDLD protocol applies the software configuration to analyze various parameters included in the received frame and detects the occurrence of a unidirectional path fault based on the result of the analysis. This arrangement requires a relatively long time for detection of a fault. It is thus desired to shorten the time period required for detecting a unidirectional path fault.

SUMMARY

There is accordingly a requirement for detecting a unidirectional path fault between two communication devices within a short time period.

In order to address at least part of the requirement described above, the present invention provides various aspects and embodiments described below.

One aspect of the present invention is directed to a network system, comprises: a first communication device being set up with a first address; and a second communication device connected with the first communication device via a network and being set up with a second address, wherein the first communication device includes: a monitor frame transmitter configured to generate a monitor frame including the second address as a destination address and the first address as a source address, and to output the generated monitor frame to the network; and a monitoring-response frame monitor configured to monitor reception of a monitoring-response frame sent back from the second communication device, wherein the second communication device includes: a monitoring-response frame transmitter configured to, in response to reception of the monitor frame, generate the monitoring-response frame by exchanging the destination address in the received monitor frame for a source address and the source address in the received monitor frame for a destination address, and output the generated monitoring-response frame to the network.

In the network system according to this aspect of the present invention, when receiving a monitor frame, the second communication device generates a monitoring-response frame by exchanging the destination address in the received monitor frame for a source address and the source address in the received monitor frame for a destination address. The procedure of generating the monitoring-response frame is thus readily achievable by hardware processing, which results in speeding up the processing. The first communication device monitors reception of the monitoring-response frame to detect the occurrence of a path fault between the first communication device and the second communication device. This arrangement of the network system does not require software processing, thus enabling the occurrence of a unidirectional path fault between the first communication device and the second communication device to be detected within a short time period.

In one preferable embodiment of the network system, the second communication device further includes: a receive buffer configured to store the received monitor frame; and a send buffer configured to store the generated monitoring-response frame, and the monitoring-response frame transmitter reads out the destination address from the monitor frame stored in the receive buffer and records the read-out destination address as the source address of the monitoring-response frame stored in the send buffer, while reading out the source address from the monitor frame stored in the receive buffer and recording the read-out source address as the destination address of the monitoring-response frame stored in the send buffer.

The network system of this embodiment enables the hardware configuration to perform the procedure of setting the destination address in the received monitor frame to the source address of the monitoring-response frame and the source address in the received monitor frame to the destination address of the monitoring-response frame.

In another preferable embodiment of the network system, the first communication device further includes: a port configured to send and receive at least the monitor frame and the monitoring-response frame; and a port controller configured to set a frame sending/receiving-enabled state as a logical status of the port when the monitoring-response frame monitor detects reception of the monitoring-response frame at the port, and to set a frame sending/receiving-disabled stated as the logical status of the port while when the monitoring-response frame monitor does not detect reception of the monitoring-response frame at the port.

The network system of this embodiment cuts off frame sending/receiving at the port, where a fault is detected. This arrangement prevents frame looping in the network system, due to the occurrence of a fault.

In another preferable embodiment of the network system, the monitor frame transmitter sets a monitor frame identifier representing identification of the monitor frame, as part of the monitor frame, and in generating the monitoring-response frame, the monitoring-response frame transmitter changes the monitor frame identifier set in the monitor frame to a monitoring-response frame identifier representing identification of the monitoring-response frame.

The network system of this embodiment allows for easy discrimination between the monitor frame and the monitoring-response frame. In the network system of this embodiment, when the second communication device is configured to send a monitor frame to the first communication device, the first communication device can readily identify whether the incoming frame sent from the second communication device is either a monitoring-response frame sent back as a return to the monitor frame sent from the first communication device or a monitor frame newly sent from the second communication device.

In another preferable embodiment of the network system, the monitoring-response frame transmitter generates the monitoring-response frame by changing only the destination address and the source address in the monitor frame.

The network system of this embodiment generates the monitoring-response frame by the simpler procedure and thus enables detection of the occurrence of a fault within a shorter time period. The monitoring-response frame is generated by changing only the settings of the destination address and the source address in the received monitor frame. In another system configuration including one or more other communication devices (frame relay devices) provided between the first communication device and the second communication device, the one or more other communication device is allowed to relay the monitoring-response frame, as well as a general frame, to the first communication device. This arrangement enables the occurrence of a fault to be detected in a large-scaled network system, while enabling the occurrence of a fault between the first communication device and the second communication device to be detected in a modified system configuration having one or more other communication devices (frame relay devices) provided between the first communication device and the second communication device.

In another preferable embodiment of the network system, the first communication device further includes: a user interface configured to set approval or non-approval of generation and transmission of the monitoring-response frame by the second communication device.

The network system of this embodiment enables the user to readily set approval or non-approval of generation and transmission of the monitoring-response frame by the second communication device.

In another preferable embodiment of the network system, both the first communication device and the second communication device are layer 2 switches.

The network system of this embodiment enables the occurrence of a fault in the layer 2 network between the layer 2 switches to be detected within a short time period.

Another aspect of the invention is directed to a layer 2 switch being set up with a second address and connected with a communication device being set up with a first address via a network comprises: a monitoring-response frame transmitter configured to, in response to reception of a monitor frame that is a layer 2 frame including the second address as a destination address and the first address as a source address, generate a monitoring-response frame by exchanging the destination address in the received monitor frame for a source address and the source address in the received monitor frame for a destination address, and output the generated monitoring-response frame to the network.

When receiving a monitor frame, the layer 2 switch according to this aspect of the invention generates a monitoring-response frame by exchanging the destination address in the received monitor frame for a source address and the source address in the received monitor frame for a destination address. The procedure of generating the monitoring-response frame is thus readily achievable by hardware processing, which results in speeding up the processing. This arrangement of the layer 2 switch enables the occurrence of a unidirectional path fault between the layer 2 switch and the communication device to be detected within a short time period.

Another aspect of the invention is directed to a method of detecting occurrence of a fault in a network connecting a first communication device being set up with a first address and a second communication device being set up with a second address, the method comprising: (a) the first communication device generating a monitor frame including the second address as a destination address and the first address as a source address, and outputting the generated monitor frame to the network; (b) in response to reception of the monitor frame, the second communication device generating a monitoring-response frame by exchanging the destination address in the received monitor frame for a source address and the source address in the received monitor frame for a destination address, and outputting the generated monitoring-response frame to the network; and (c) the first communication device monitoring reception of the monitoring-response frame output from the second communication device.

In the method according to this aspect of the invention, the second communication device generates a monitoring-response frame by exchanging the destination address in the received monitor frame for a source address and the source address in the received monitor frame for a destination address. The procedure of generating the monitoring-response frame is thus readily achievable by hardware processing, which results in speeding up the processing. The first communication device monitors reception of the monitoring-response frame to detect the occurrence of a path fault between the first communication device and the second communication device. The method of this arrangement does not require software processing, thus enabling the occurrence of a unidirectional path fault between the first communication device and the second communication device to be detected within a short time period.

The principle of the present invention may be actualized by diversity of other applications, for example, a control method of the network system or the layer 2 switch, a computer program including the functional blocks of the network system or the layer 2 switch, and a computer program product.

DESCRIPTION OF THE PREFERRED EMBODIMENT

A. Embodiment

A1. System Configuration

Figure 1:
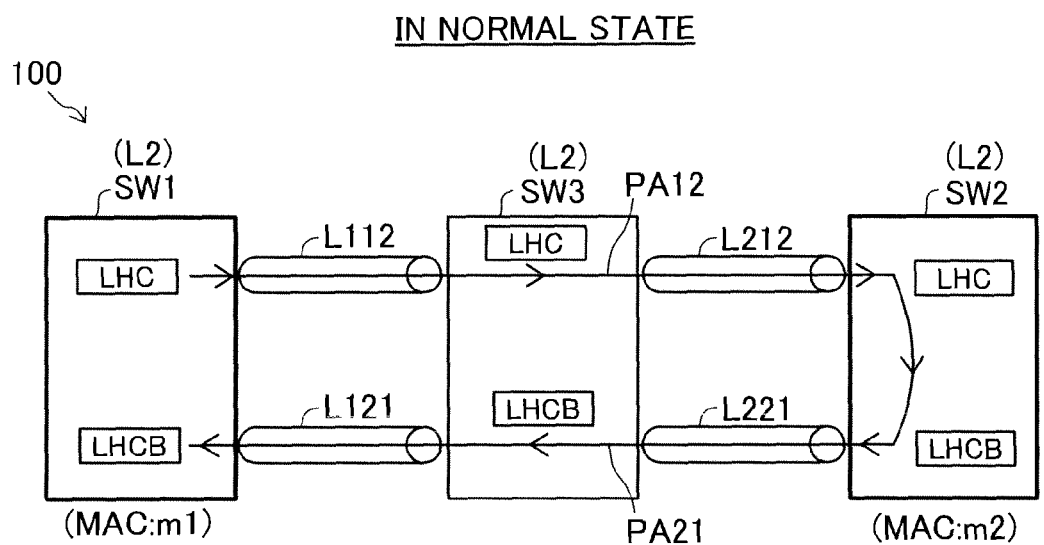
FIG. 1 is an explanatory diagram of the schematic configuration of a network system 100 according to one embodiment of the invention.
Figure 1:
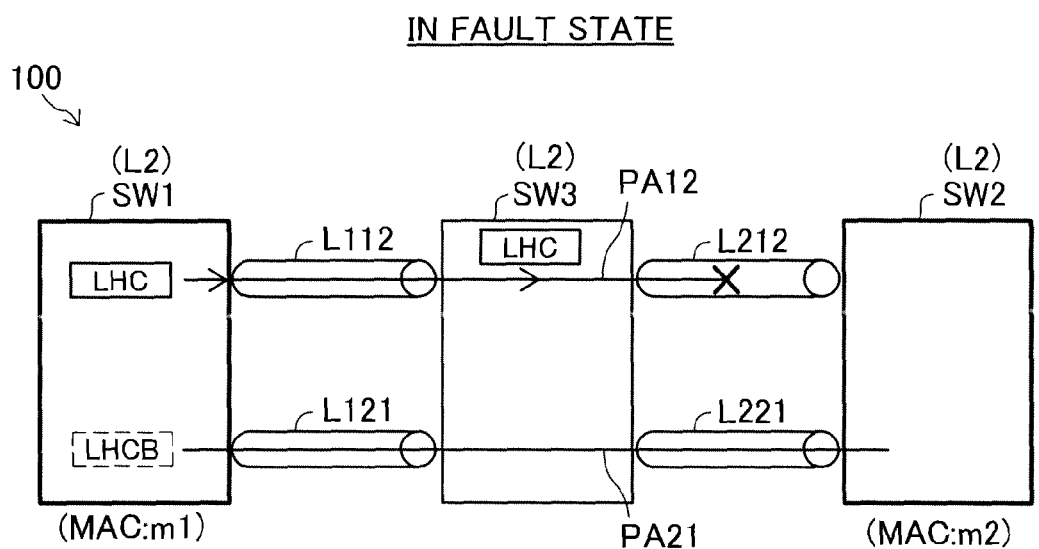

FIG. 1 is an explanatory diagram of the schematic configuration of a network system 100 according to one embodiment of the invention. The upper drawing of FIG. 1 shows the network system 100 in a normal state that all paths between a first switch SW1 and a second switch SW2 are normal. The lower drawing of FIG. 1 shows the network system 100 in a fault state that a fault occurs on one of the paths between the first switch SW1 and the second switch SW2.

The network system 100 of the embodiment includes the first switch SW1, the second switch SW2, and a third switch SW3 which is located between the first switch SW1 and the second switch SW2. All the switches SW1 to SW3 are layer 2 switches having a plurality of ports (not shown) and being configured to relay a layer 2 frame (i.e., a frame of the second layer or data link layer in OSI Reference Model) received from a terminal (for example, a personal computer or a server) connected with a port.

In this embodiment, the network system 100 relays an Ethernet (registered trademark) frame. The frame to be relayed in the network system 100 is, however, not restricted to the Ethernet frame but may be any of various frames, packets, and cells specified by an arbitrary layer 2 protocol, for example, FDDI (Fiber-Distributed Data Interface) or ATM (Asynchronous Transfer Mode). A MAC (Media Access Control) address "m1" is preset as the layer 2 address in the first switch SW1. Similarly another MAC address "m2" is preset as the layer 2 address in the second switch SW2. Both the MAC addresses "m1" and "m2" are dedicated addresses for path fault monitoring.

The first switch SW1 and the third switch SW3 are interconnected by two physical links L112 and L121. The third switch SW3 and the second switch SW2 are interconnected by two physical links L212 and L221. This structure forms a path PA12 from the first switch SW1 to the second switch SW2, where a frame is relayed in the sequence of the first switch SW1, the physical link L112, the third switch SW3, the physical link L212, and the second switch SW2. This structure also forms a path PA21 from the second switch SW2 to the first switch SW1, where a frame is relayed in the sequence of the second switch SW2, the physical link L221, the third switch SW3, the physical link L121, and the first switch SW1.

In the network system 100, the first switch SW1 sends a monitor frame ("Link Health Check" frame: hereafter referred to as "LHC frame") to monitor the occurrence of any fault anywhere in the two paths PA12 and PA21. As shown in the upper drawing of FIG. 1, when there is no fault occurring anywhere in the two paths PA12 and PA21, the LHC frame sent from the first switch SW1 is relayed to the second switch SW2 through the path PA12. When receiving the LHC frame, the second switch SW2 sends back a monitoring-response frame ("Link Health Check Back" frame: hereafter referred to as "LHCB frame"). As described later, the LHCB frame is a return frame in response to the LHC frame, and the second switch SW2 generates the LHCB frame by hardware processing. The LHCB frame sent from the second switch SW2 is relayed to the first switch SW1 through the path PA21. The first switch SW1 monitors the reception of the LHCB frame. When receiving the LHCB frame within a preset time period, the first switch SW1 determines that both the paths PA12 and PA21 are normal.

As shown in the lower drawing of FIG. 1, when a fault occurs on, for example, the physical link L212 (unidirectional path fault), the LHC frame is not relayed to the second switch SW2. In this state, due to the failed relay of the LHC frame, the second switch SW2 does not send back the LHCB frame. The first switch SW1 accordingly does not receive the LHCB frame within the preset time period and determines that a fault occurs in at least one of the two paths PA12 and PA21.

For unidirectional path fault monitoring, the first switch SW1 and the second switch SW2 performs series of processing for transmission and reception of the LHC frame and transmission and reception of the LHCB frame, in addition to relay of the frame sent from the terminal (not shown). The first switch SW1 and the second switch SW2 respectively correspond to the first communication device and the second communication device in the claims of the invention. The third switch SW3 is not a communication device according to one embodiment of the invention but is a conventional layer 2 switch. The third switch SW3 is thus configured to relay a received frame based on a destination MAC address in the received frame according to a destination table (not shown), which is a table to be referred to for relaying and correlates the destination MAC address to the output port.

Figure 2:
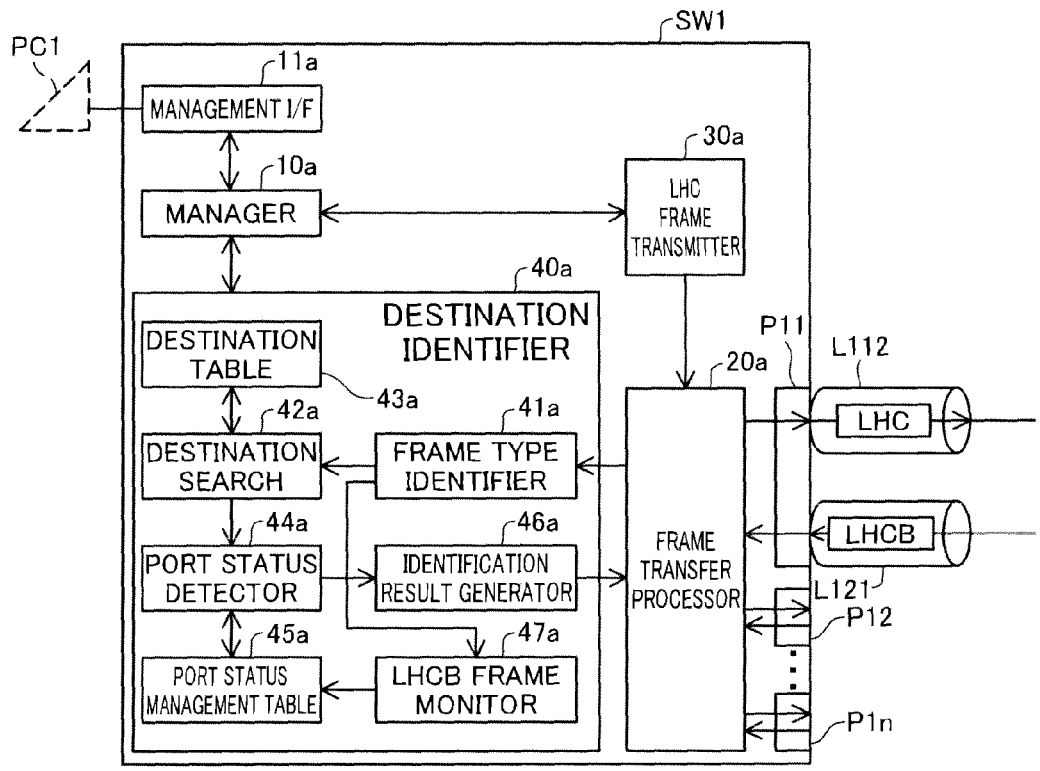
FIG. 2 is an explanatory diagram of the detailed structure of the first switch SW1 and the second switch SW2 shown in FIG. 1.
Figure 2:
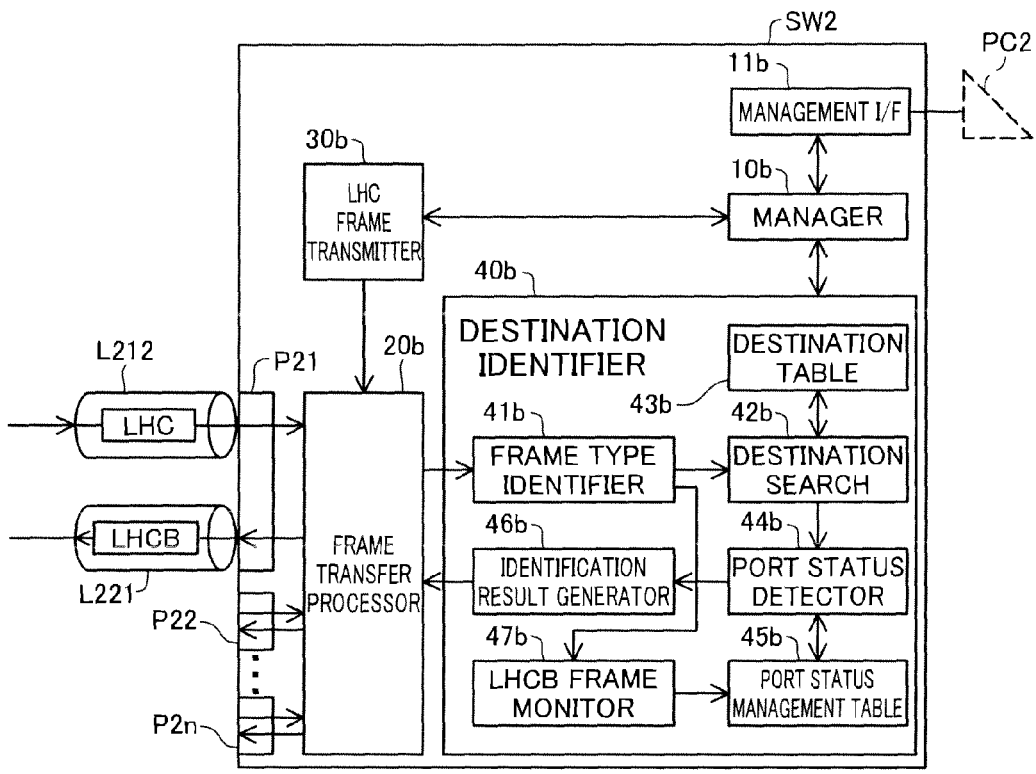

FIG. 2 is an explanatory diagram of the detailed structure of the first switch SW1 and the second switch SW2 shown in FIG. 1. The first switch SW1 and the second switch SW2 have the identical structure, so that the following description only refers to the second switch SW2. The second switch SW2 includes a plurality of ports P21, P22, ..., P2n, a frame transfer processor 20b, a destination identifier 40b, an LHC frame transmitter 30b, a manager 10b, and a management interface 11b.

Each of the plurality of ports P21, P22, P2n terminates a physical link on the sender side and a physical link on the receiver side. For example, the port P21 terminates the physical link L212 on the sender side and the physical link L221 on the receiver side.

Figure 3:
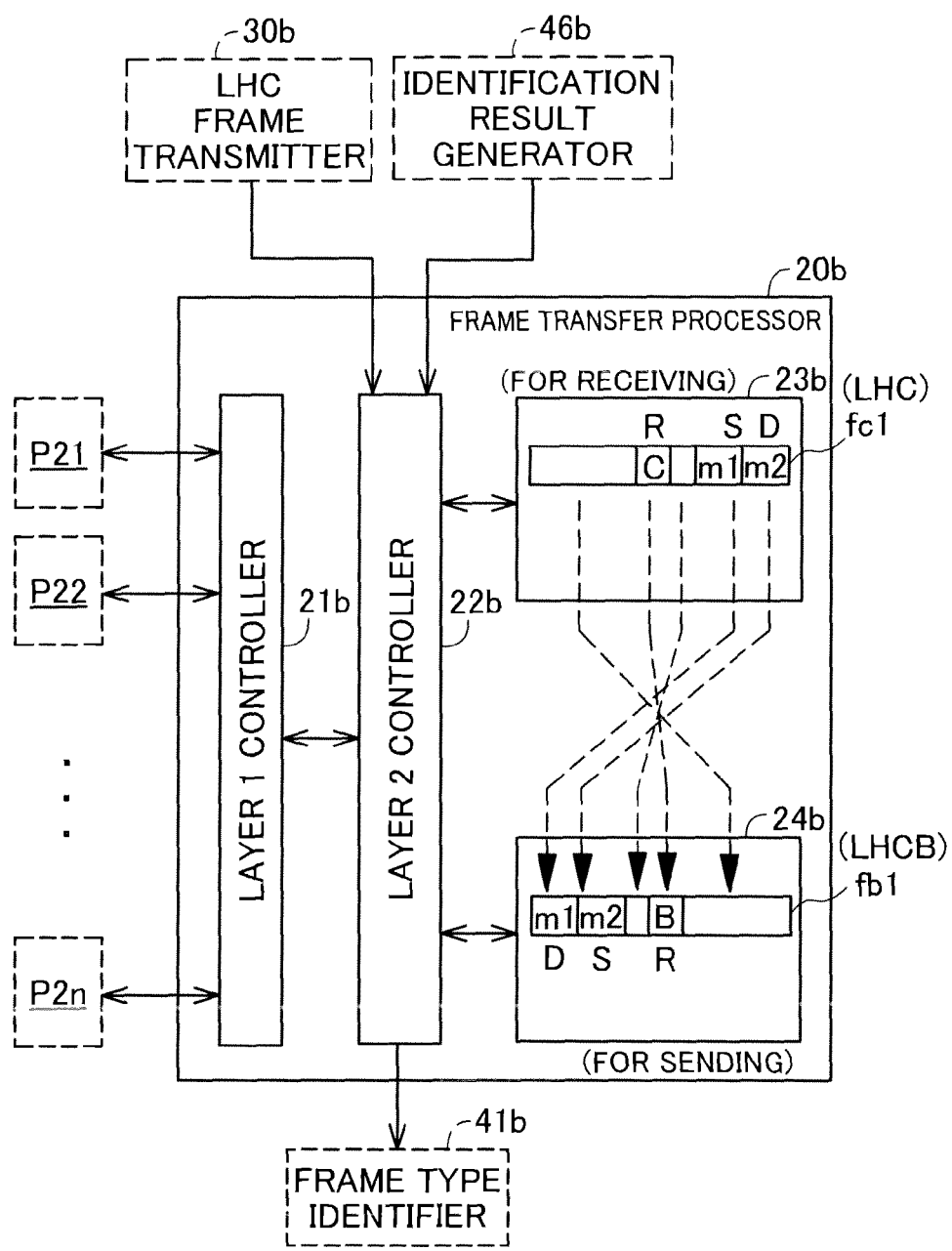
FIG. 3 is an explanatory diagram of the detailed structure of the frame transfer processor 20b shown in FIG. 2.

FIG. 3 is an explanatory diagram of the detailed structure of the frame transfer processor 20b shown in FIG. 2. The frame transfer processor 20b includes a layer 1 controller 21b, a layer 2 controller 22b, a receive buffer 23b, and a send buffer 24b. Each of these functional blocks includes a storage element and circuitry such as an ASIC (Application Specific Integrated Circuit) to be capable of hardware processing.

The layer 1 controller 21b is a functional block for layer 1 processing (the first layer or physical layer in OSI Reference Model) and is connected with the respective ports P21, P22, P2n and with the layer 2 controller 22b. The layer 1 controller 21b generates a layer 2 frame from a signal received at each of the ports P21, P22, P2n and outputs the generated layer 2 frame to the layer 2 controller 22b. The layer 1 controller 21b also generates a signal from the layer 2 frame received from the layer 2 controller 22b and outputs the generated signal to each of the ports P21, P22, ..., P2n.

The layer 2 controller 22b is a functional block for layer 2 processing and is connected with the layer 1 controller 21b, the receive buffer 23b and the send buffer 24b. The layer 2 controller 22b is also connected with the LHC frame transmitter 30b, an identification result generator 46b, and a frame type identifier 41b, which will be discussed later. The layer 2 controller 22b stores a frame received from the layer 1 controller 21b into the receive buffer 23b, while reading out a frame from the receive buffer 23b and sending the read-out frame to another functional block. In response to an instruction from another functional block, the layer 2 controller 22b generates a frame and stores the generated frame into the send buffer 24b, while reading out a frame from the send buffer 24b and outputting the read-out frame to the layer 1 controller 21b.

The receive buffer 23b stores a frame received by the second switch SW2. In the illustrated example of FIG. 3, an LHC frame fc1 is stored in the receive buffer 23b. The send buffer 24b stores a frame to be sent by the second switch SW2. In the illustrated example of FIG. 3, an LHCB frame fb1 is stored in the send buffer 24b.

Referring back to FIG. 2, the destination identifier 40b includes a frame type identifier 41b, a destination table 43b, a destination search 42b, a port status management table 45b, a port status detector 44b, an identification result generator 46b, and an LHCB frame monitor 47b.

The frame type identifier 41b identifies the type of each received frame. The destination table 43b is referred to in the process of relaying the received frame and is structured to correlate the destination MAC address and the identifier such as VLAN-ID set in a frame to the output port of the frame. The destination search 42b refers to the destination table 43b and determines the output port, from which the received frame is to be relayed. The port status management table 45b is referred to in the process of managing the logical statuses of the respective ports. The port status detector 44b refers to the port status management table 45b and detects the status of the output port. The identification result generator 46b provides a discard instruction or any of other various instructions described later and notification of the determined output port to the frame transfer processor 20b. The LHCB frame monitor 47b monitors the reception of the LHCB frame sent from a monitoring object switch.

The manager 10b is connected with the management interface 11b, the LHC frame transmitter 30b and the destination identifier 40b to control the operations of the respective functional blocks. The management interface 11b is a functional block of providing an interface for connection with a management terminal PC2 shown by the broken line. The interface may be, for example, a USB (Universal Serial Bus) interface, an RS232C or another serial interface or IEEE802.3u. In response to an instruction received from the manager 10b, the LHC frame transmitter 30b gives an LHC frame generation instruction to the frame transfer processor 20b.

The first switch SW1 has the same structure as that of the second switch SW2 as mentioned above. In the drawing of FIG. 2, for the purpose of making the same components in the respective switches SW1 and SW2 distinguishable, a suffix "a" is added to the numerals representing the respective components of the first switch SW1, while a suffix "b" is added to the numerals representing the respective components of the second switch SW2.

The network system 100 performs path fault monitoring start-up, incoming frame processing and LHCB frame monitoring (discussed later) to detect the occurrence of a path fault in a short time period.

The LHC frame and the LHCB frame discussed above respectively correspond to the monitor frame and the monitoring-response frame in the claims of the invention. The LHC frame transmitter 30a and the frame transfer processor 20a correspond to the monitor frame transmitter in the claims of the invention. The frame transfer processor 20a and the LHCB frame monitor 47a correspond to the monitoring-response frame monitor and the port controller in the claims of the invention. The frame transfer processor 20b corresponds to the monitoring-response frame transmitter in the claims of the invention. The return identifier corresponds to the monitor frame identifier in the claims of the invention.

A2. Path Fault Monitoring Start-Up

Figure 4:
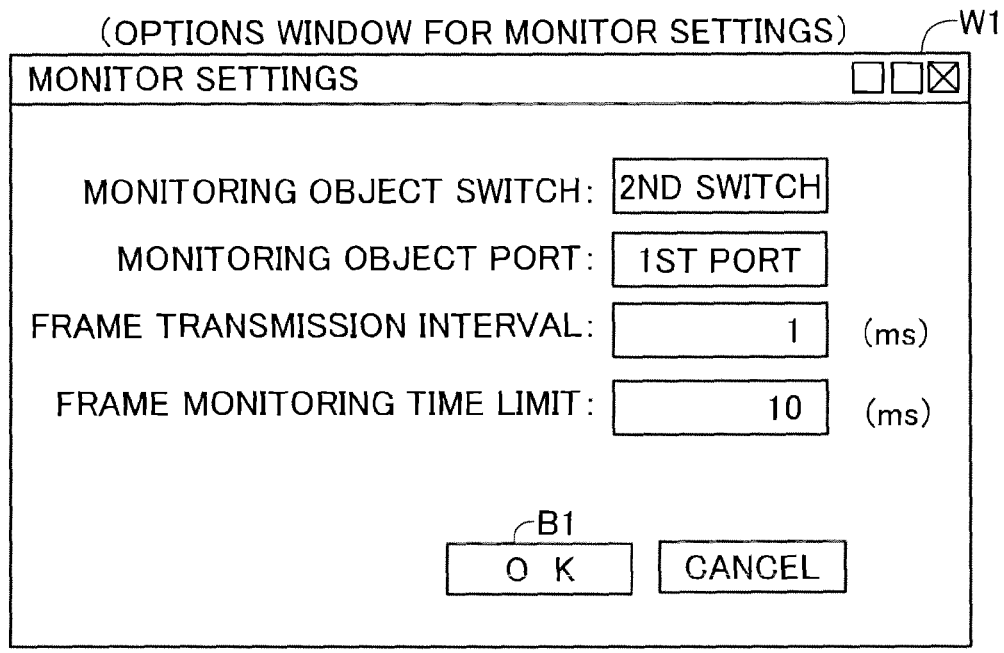
FIG. 4 is a first explanatory diagram of an options window W1 for path fault monitoring.
Figure 5:
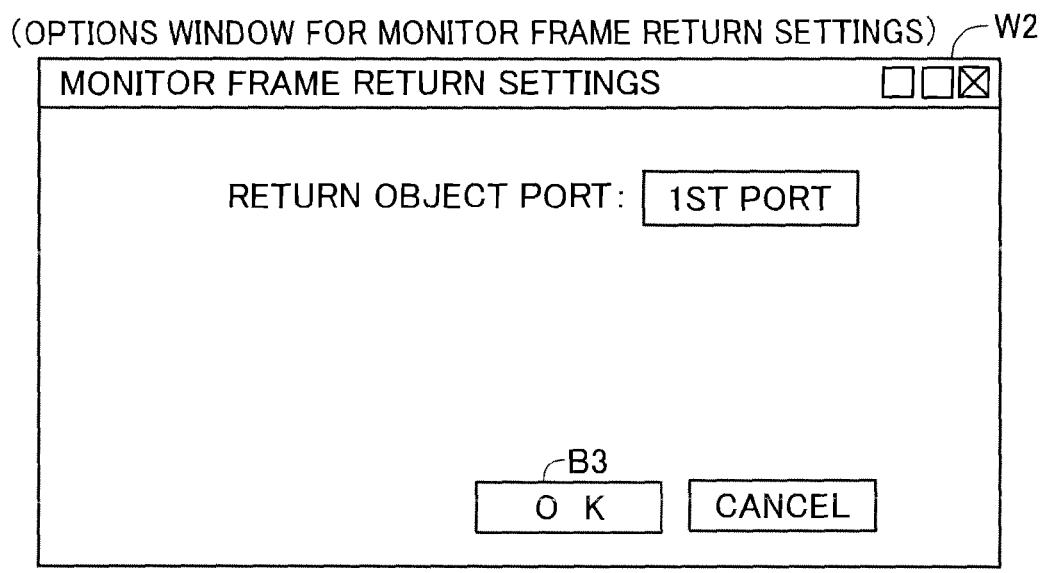
FIG. 5 is a second explanatory diagram of another options window W2 for path fault monitoring.

FIG. 4 is a first explanatory diagram of an options window W1 for path fault monitoring. FIG. 5 is a second explanatory diagram of another options window W2 for path fault monitoring. For monitoring the paths PA12 and PA21 shown in FIG. 1, the user (e.g., the system administrator of the network system 100) performs predetermined settings for the switches terminating these paths PA12 and PA21 (i.e., the first switch SW1 and the second switch SW2).

More specifically, the user connects a management terminal PC1 with the first switch SW1 as shown in FIG. 2 to display the options window W1 for monitor settings shown in FIG. 4 on the management terminal PC1 for entries of various parameters. As shown in FIG. 4, the options window W1 for monitor settings includes fields for setting respective parameters, i.e., a monitoring object switch (that is a switch on the other end of a monitoring object path), a monitoring object port, a frame transmission interval, and a frame monitoring time limit, and an OK button B1. In the illustrated example of FIG. 4, the "second switch SW2" is entered in the monitoring object switch field, the "first port (port P11)" in the monitoring object port field, "1 (ms)" in the frame transmission interval field, and "10 (ins)" in the frame monitoring time limit field. The frame transmission interval means a time interval between transmission of an LHC frame and transmission of a next LHC frame. The frame monitoring time limit means a reference time period for detecting the occurrence of a path fault. When not receiving a next LHC frame within the frame monitoring time limit after reception of an LHC frame, the first switch SW1 detects the occurrence of a path fault. In response to the user's click of the OK button B1, the entered respective parameters are stored into a memory (not shown) in the first switch SW1, and a path monitoring start-up instruction is sent from the management terminal PC1 to the first switch SW1.

The user connects the management terminal PC2 with the second switch SW2 as shown in FIG. 2 to display the options window W2 for monitor frame return settings shown in FIG. 5 on the management terminal PC2. As shown in FIG. 5, the options window W2 for monitor frame return settings includes a field for setting a return object port and an OK button B3. The return object port means a port set to, in response to reception of a monitor frame (LHC frame), send back a monitoring-response frame (LHCB frame) to the sender of the LHC frame (frame returning). In the illustrated example of FIG. 5, the "first port (port P21)" is entered in the return object port field. When the user enters an intended return object port and clicks the OK button B3, the entered return object port is set in the second switch SW2. The options window W2 for monitor frame return settings shown in FIG. 5 corresponds to the user interface in the claims of the invention.

Figure 6:
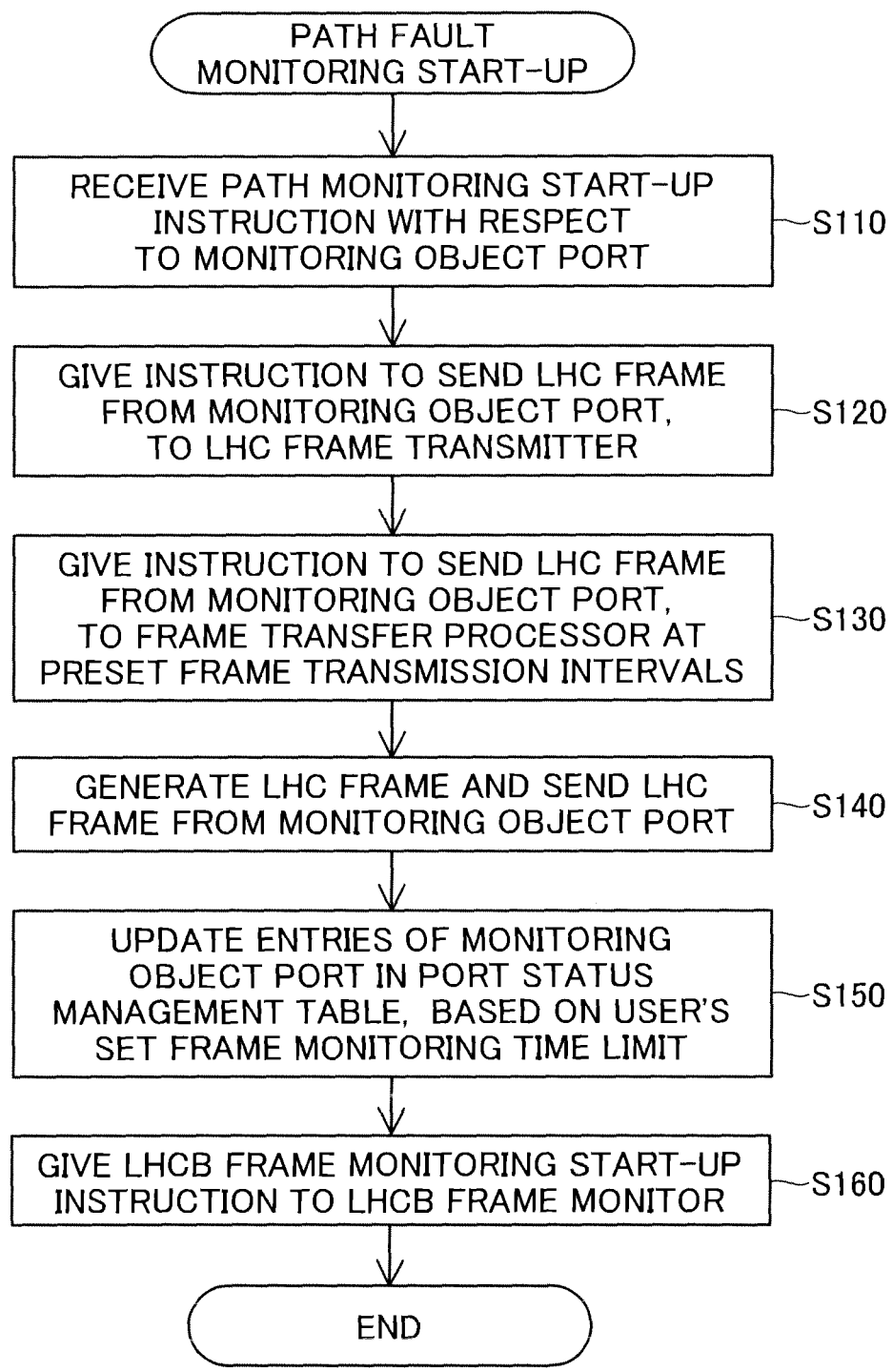
FIG. 6 is a flowchart showing the procedure of path fault monitoring start-up.

FIG. 6 is a flowchart showing the procedure of path fault monitoring start-up. The path fault monitoring start-up of FIG. 6 is performed in a switch set as the monitoring entity by the user. In the above example, the first switch SW1 is set as the monitoring entity and accordingly performs the path fault monitoring start-up.

The manager 10a of the first switch SW1 receives a path monitoring start-up instruction from the management terminal PC1 via the management interface 11a (step S110) and gives an instruction to send the LHC frame from the monitoring object port, to the LHC frame transmitter 30a (step S120).

The LHC frame transmitter 30a gives an instruction to send the LHC frame from the set monitoring object port to the set monitoring object switch, to the frame transfer processor 20a at the set frame transmission intervals (step S130). The frame transfer processor 20a then generates an LHC frame and sends the generated LHC frame from the set monitoring object port, in response to the instruction given from the LHC frame transmitter 30a (step S140).

Figures 7, 8:
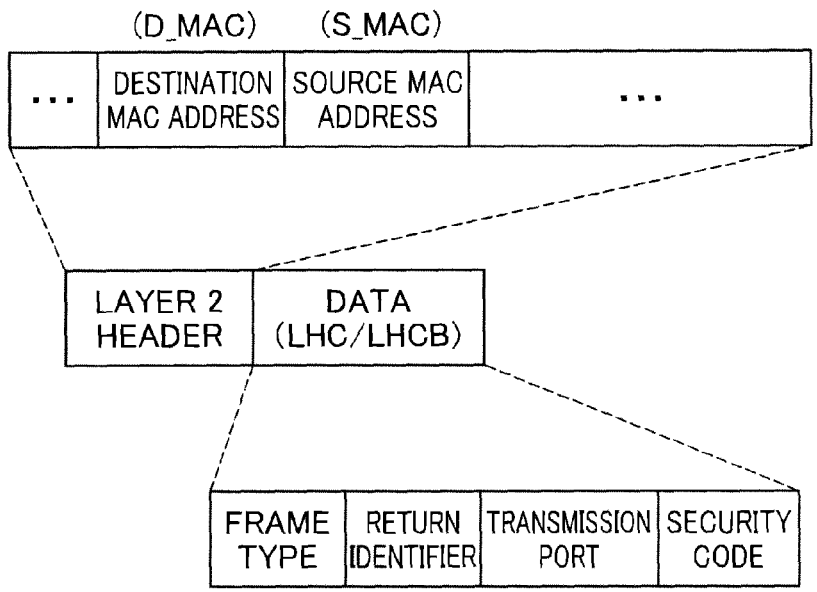
FIG. 7 is an explanatory diagram showing the frame format of the LHC frame and the LHCB frame.
FIG. 8 is an explanatory diagram showing one example of the port status management table in the initial state when one port P11 of the first switch SW1 is set as the monitoring object port.

FIG. 7 is an explanatory diagram showing the frame format of the LHC frame and the LHCB frame. Like the general Ethernet frame format, both the LHC frame and the LHCB frame have a layer 2 header filed and a data field. In the layer 2 header field of the LHC frame and of the LHCB frame, a dedicated MAC address for monitoring is entered in a destination MAC address field. The non-general frame (LHC frame and LHCB frame) are distinguishable from a general frame, based on the settings in the destination MAC address field. The data filed of the LHC frame and of the LHCB frame includes a return identifier field. The LHC frame is distinguishable from the LHCB frame, based on the settings in the return identifier field. In the illustrated example of FIG. 4, since the "second switch SW2" is set as the monitoring object switch, the MAC address "m2" of the second switch SW2 is entered in the destination MAC address field. The MAC address "m1" of the first switch SW1 is entered in a source MAC address field of the layer 2 header field of the LHC frame. A value representing the LHC frame is entered in the return identifier field of the data field in the LHC frame.

The LHC frame sent from the first switch SW1 is received by the third switch SW3 shown in FIG. 1 and is relayed to the second switch SW2 according to the destination table, which is the table to be referred to for relaying and correlates the destination MAC address to the output port.

Referring back to the flowchart of FIG. 6, after transmission of the LHC frame, the manager 10a of the first switch SW1 reads out the user's set frame monitoring time limit from the memory (not shown) and updates the entries of the monitoring object port in the port status management table 45a, based on the read-out frame monitoring time limit (step S150).

FIG. 8 is an explanatory diagram showing one example of the port status management table in the initial state when one port P11 of the first switch SW1 is set as the monitoring object port.

As shown in FIG. 8, the port status management table 45a has the settings of a logical status, a monitoring status, a monitoring time limit and a monitoring timer with regard to each of the ports. The logical status means the status involved in transmission and reception of frames at each port. Either "frame sending/receiving enabled (FWD)" representing the state of no occurrence of any path fault or "frame sending/receiving disabled (BLK)" representing the state of the occurrence of a path fault may be set as the logical status. The monitoring status means the status of monitoring at each port. Either "fault monitoring" representing the state of monitoring the occurrence of any path fault or "recovery monitoring" representing the state of monitoring recovery after the occurrence of a path fault may be set as the monitoring status. The monitoring time limit is the frame monitoring time limit set at step S150 in the flowchart of FIG. 6. The monitoring timer shows the elapse of time since transmission of a previous LHC frame.

FIG. 8 shows the port status management table 45a in the state after the update of the entries of the port P11 according to the procedure of path fault monitoring start-up, wherein the ports P12 to P1n have been subjected to path fault monitoring. In the initial state immediately after the update of the entries of the port P11, the logical status, the monitoring status, the monitoring time limit and the monitoring timer of the port P11 are respectively set as "BLK", "recovery monitoring", "10 ms", and "0 ms".

Referring back to the flowchart of FIG. 6, after updating the entries of the monitoring object port at step S150, the manager 10a gives an LHCB frame monitoring start-up instruction to the LHCB frame monitor 47a (step S160). The LHCB frame monitor 47a receiving the LHCB frame monitoring start-up instruction performs LHCB frame monitoring discussed later.

A3. Incoming Frame Processing

FIGS. 9 through 14 are flowcharts showing the procedure of incoming frame processing. The incoming frame processing is triggered by incoming of a frame at one of the ports in either of the first switch SW1 and the second switch SW2. General frames as well as the LHC frames and LHCB frames discussed above are transmitted between the first switch SW1 and the second switch SW2. The incoming frame processing is triggered by reception of any of these frames. The following description is on the assumption that the second switch SW2 receives an LHC frame and a general frame, while the first switch SW1 receives an LHCB frame. The LHC frame is relayed through the path PA12, while the LHCB frame is relayed through the path PA21 as described above with reference to FIG. 1.

A3-1. Receiving LHC Frame

Figure 9:
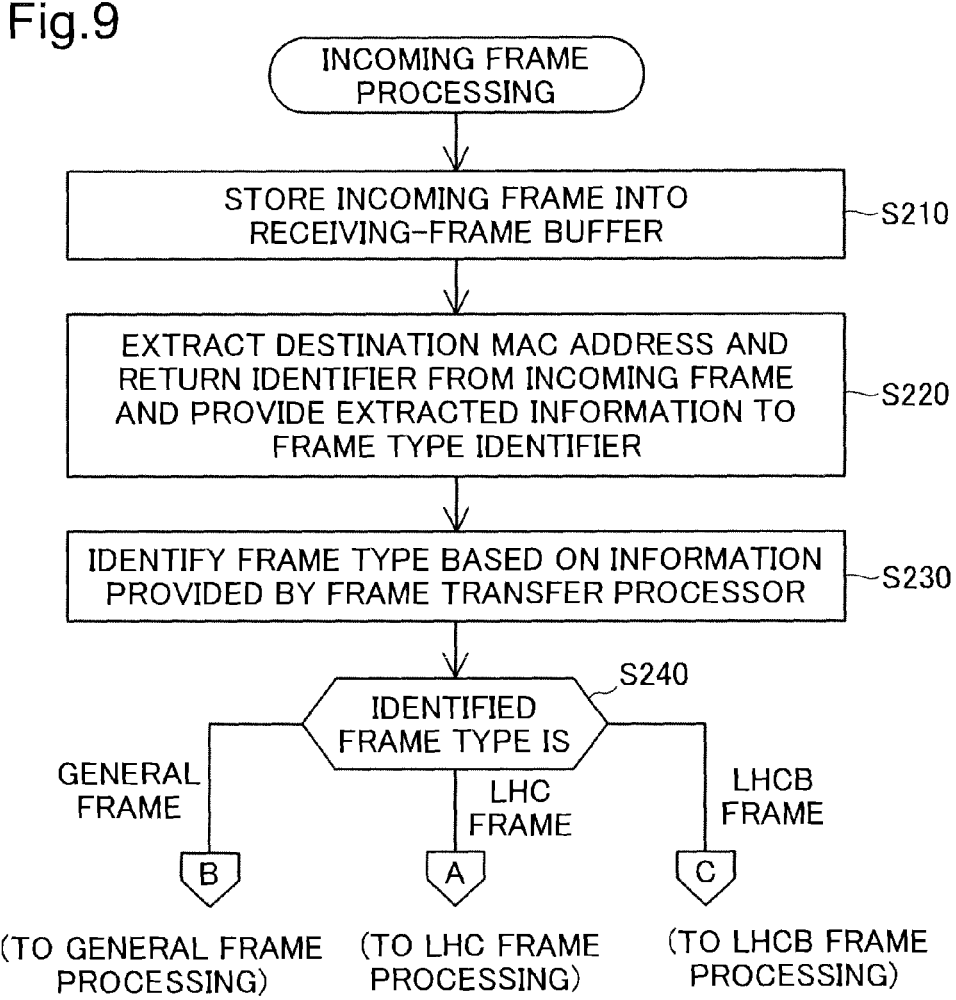
FIGS. 9 through 14 are flowcharts showing the procedure of incoming frame processing.

Referring to the flowchart of FIG. 9, the layer 2 controller 22b of the second switch SW2 stores an incoming frame into the receive buffer 23b (step S210). The layer 2 controller 22b extracts a destination MAC address and a return identifier from the incoming frame stored in the receive buffer 23b and notifies the frame type identifier 41b of the extracted destination MAC address and return identifier (step S220).

The frame type identifier 41b identifies the frame type, based on the destination MAC address and the return identifier notified by the layer 2 controller 22b (step S230). When the notified destination MAC address is the dedicated MAC address for monitoring and the notified return identifier is the value representing the LHC frame, it is identified that the incoming frame is the LHC frame (step S240).

Figure 10:
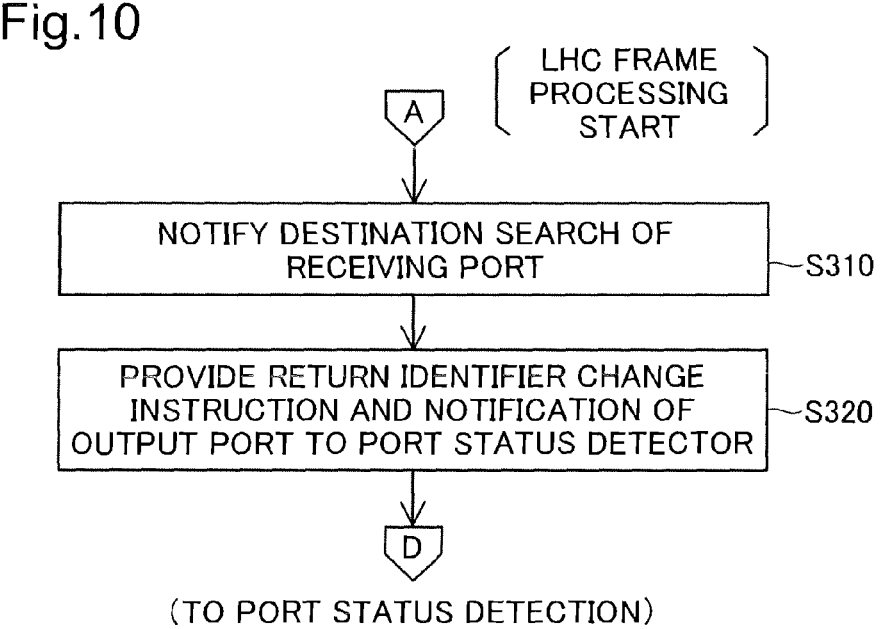

When the incoming frame is identified as the LHC frame (step S240), the processing flow goes to FIG. 10 where the frame type identifier 41b notifies the destination search 42b of a receiving port (step S310). The destination search 42b then provides a return identifier change instruction and notification of an output port to the port state detector 44b (step S320). The output port notified at step S320 means the output port of the LHCB frame discussed later and is identical with the receiving port notified from the destination search 42b at step S310.

Figure 11:
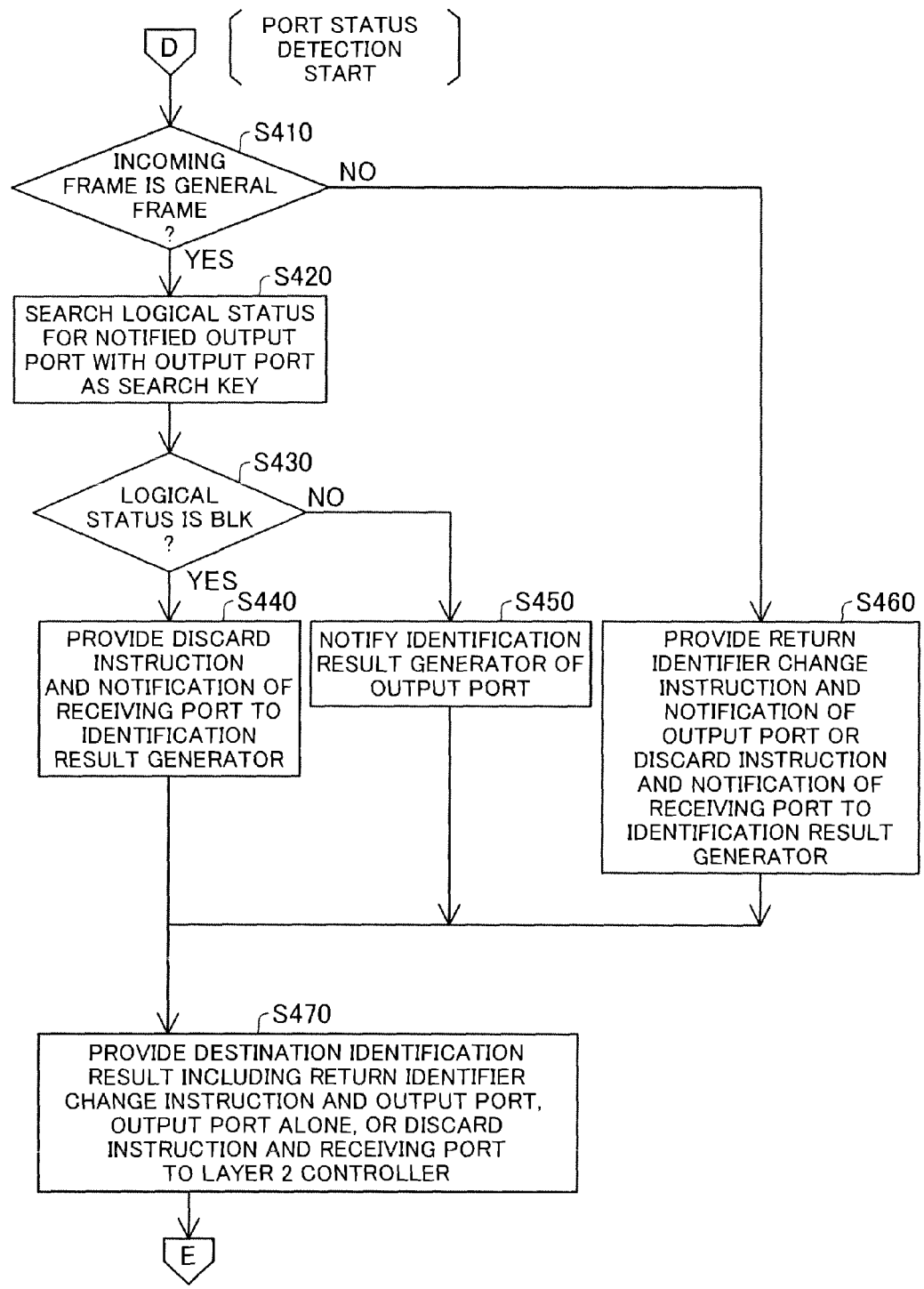

After providing the instruction and notification at step S320, the processing flow goes to FIG. 11 where the port status detector 44b identifies whether the incoming frame is a normal frame (step S410). When the incoming frame is the LHC frame, it is identified that the incoming frame is not a normal frame (step S410: No). In this case, the port status detector 44b provides either the return identifier change instruction and the notification of the output port provided by the destination search 42b or a discard instruction and notification of a receiving port to the identification result generator 46b (step S460). When the incoming frame is the LHC frame, the destination search 42b provides the return identifier change instruction and notification of the output port to the port status detector 44b. The port status detector 44b then provides the return identifier change instruction and the notification of the output port to the identification result generator 46b. When the incoming frame is the LHCB frame, on the other hand, the discard instruction and notification of the receiving port are provided to the identification result generator 46b as discussed later.

The identification result generator 46b provides a destination identification result including either the return identifier change instruction and the notification of the output port or the discard instruction and the notification of the receiving port to the layer 2 controller 22b (step S470). When the incoming frame is the LHC frame, the identification result generator 46b provides the destination identification result including the return identifier change instruction and the notification of the output port to the layer 2 controller 22b.

Figure 12:
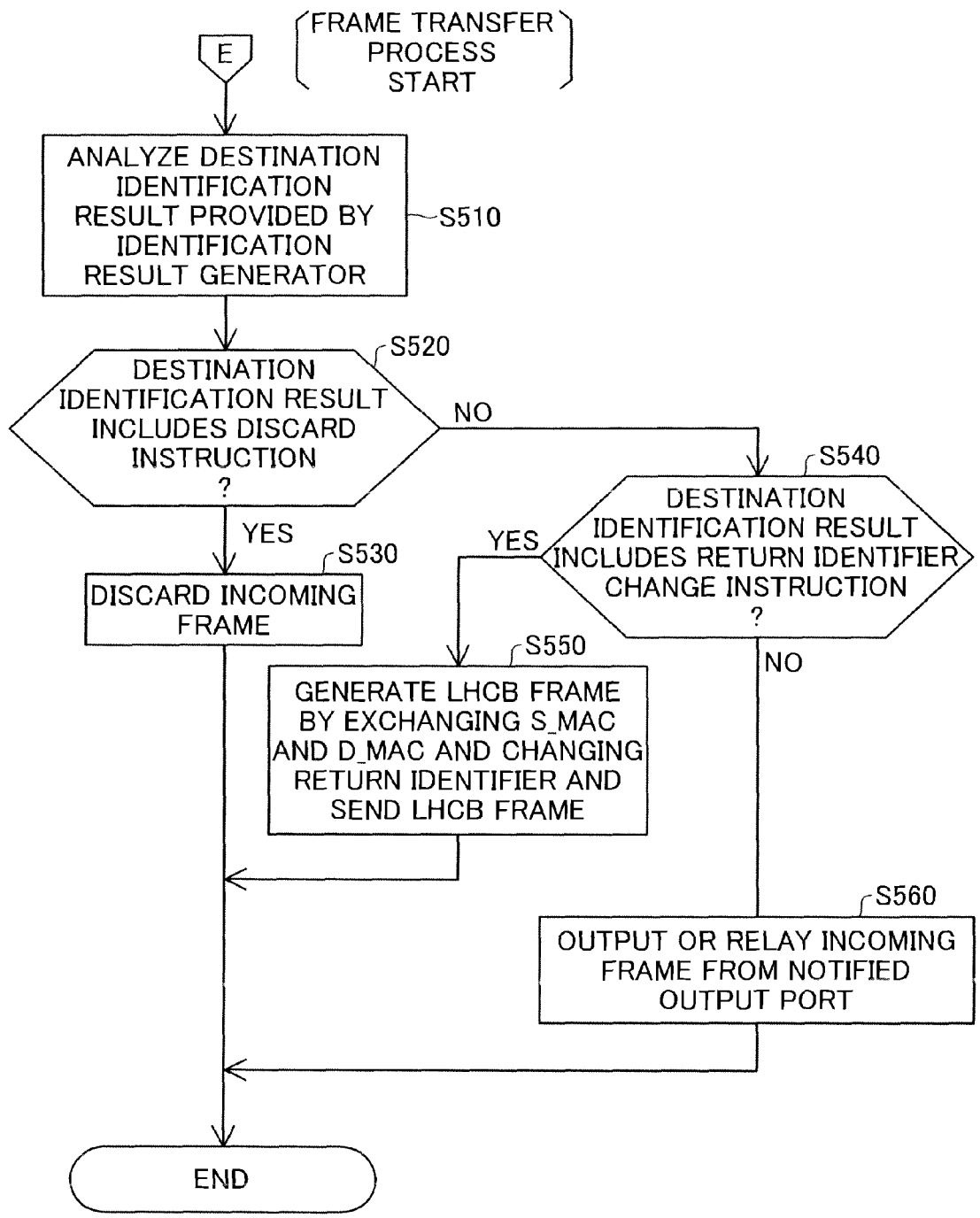

After providing the destination identification result at step S470, the processing flow goes to FIG. 12 where the layer 2 controller 22b analyzes the destination identification result provided by the identification result generator 46b (step S510) and determines whether the analyzed destination identification result includes the discard instruction (step S520). When the incoming frame is the LHC frame, the destination identification result does not include the discard instruction. In this case, the layer 2 controller 22b subsequently determines whether the analyzed destination identification result includes the return identifier change instruction (step S540).

When the incoming frame is the LHC frame, the destination identification result includes the return identifier change instruction. In this case, the layer 2 controller 22b generates the LHCB frame by exchanging the destination MAC address in the incoming frame for a source MAC address and the source MAC address in the incoming frame for a destination MAC address and changing the setting of the return identifier to the value representing the LHCB frame and sends the generated LHCB frame from the notified output port via the layer 1 controller 21b (step S550).

More specifically, in the case where the LHC frame fc1 is stored in the receive buffer 23b as shown in FIG. 3, the layer 2 controller 22b reads out "m2" set in a destination MAC address field (D) of the LHC frame fc1 and sets "m2" in a source MAC address field (S) of the LHCB frame fb1. The layer 2 controller 22b also reads out "m1" set in a source MAC address field (S) of the LHC frame fc1 and sets "m1" in a destination MAC address field (D) of the LHCB frame fb1. The layer 2 controller 22b then sets "B" (representing the LHCB frame) in a return identifier field (R) of the LHCB frame fb1, in place of "C" (representing the LHC frame) set in a return identifier field (R) of the LHC frame fc1. The settings in the other fields of the LHC frame fc1 are duplicated in the corresponding other fields of the LHCB frame fb1. The LHCB frame fb1 thus generated is output from the port P21, which is the receiving port of the incoming LHC frame.

As explained above, the LHCB frame is generated by simply exchanging the destination MAC address in the incoming LHC frame for a source MAC address and the source MAC address in the incoming LHC frame for a destination MAC address and changing the setting of the return identifier and is output from the receiving port (port P21) of the incoming LHC frame. The LHCB frame can be generated by this simple procedure of changing and exchanging the settings in part of the fields of the LHC frame. This procedure is easily achievable by the hardware processing for the purpose of speeding up the processing. The MAC address of the first switch SW1 is set as the destination MAC address in the LHCB frame. The LHCB frame output from the second switch SW2 is accordingly relayed through the third switch SW3 to the first switch SW1. As clearly understood from the processing flow on the occasion of receiving the LHC frame discussed above, the second switch SW2 does not send the LHCB frame to the first switch SW1, unless receiving the LHC frame.

A3-2. Receiving LHCB Frame

When the first switch SW1 receives the LHCB frame output from the second switch SW2, the processing flow of steps S210 to S230 shown in FIG. 9 is performed. The frame type identifier 41a identifies the frame type, based on the destination MAC address and the return identifier notified by the layer 2 controller 22a (step S240). When the notified destination MAC address is the dedicated MAC address for monitoring and the notified return identifier is the value representing the LHCB frame, it is identified that the incoming frame is the LHCB frame.

Figure 13:
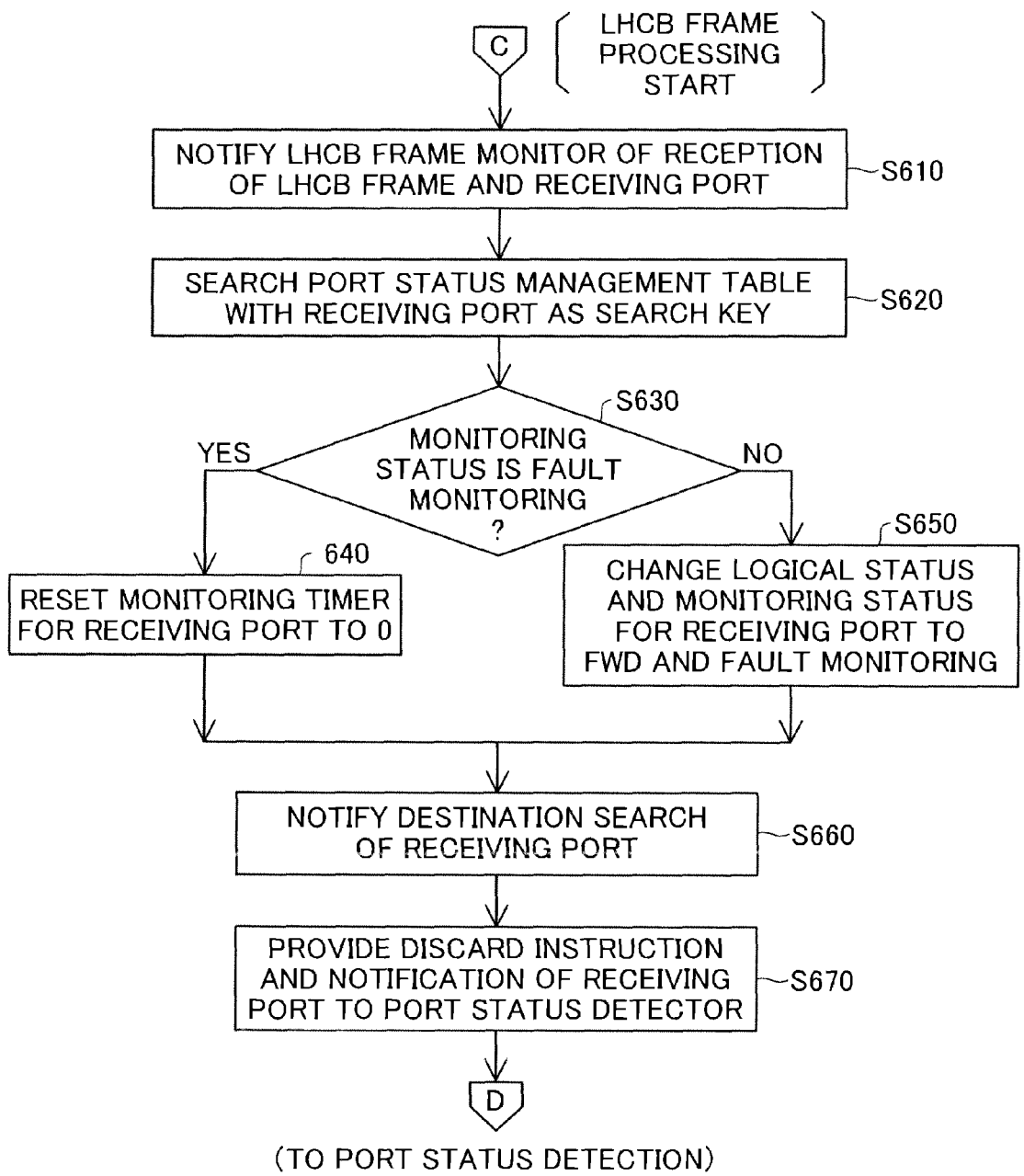
Figure 14:
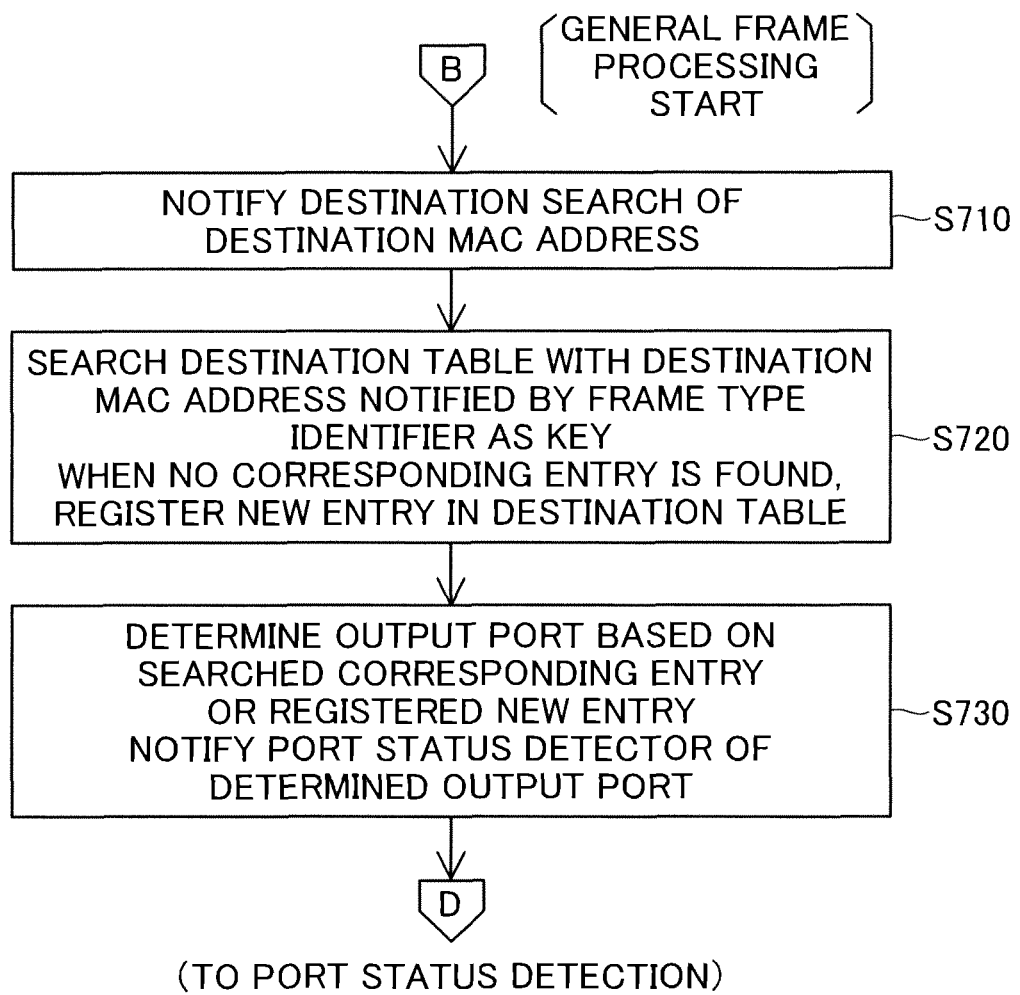

When the incoming frame is identified as the LHCB frame (step S240), the processing flow goes to FIG. 13 where the frame type identifier 41a notifies the LHCB frame monitor 47a of reception of the LHCB frame and its receiving port (step S610). The LHCB frame monitor 47a searches the port status management table 45a with the notified receiving port as the search key (step S620) and determines whether the monitoring status of the receiving port is "fault monitoring" state (step S630).

When it is determined that the monitoring status is "fault monitoring" state (step S630: Yes), the LHCB frame monitor 47a resets the monitoring timer for the notified receiving port to "0" in the port status management table 45a (step S640). When it is determined that the monitoring status is not "fault monitoring" state (step S630: No) but is the "recovery monitoring" state, on the other hand, the LHCB frame monitor 47a updates the logical status for the notified receiving port to "FWD" (representing the frame receiving/sending enabled) and the monitoring status for the notified receiving port to "fault monitoring" state in the port status management table 45a (step S650).

On the occasion of receiving the first LHCB frame, the monitoring status for the port P11 is the "recovery monitoring" state in the port status management table 45a as shown in FIG. 8. The processing of step S650 is accordingly performed to update the settings of the logical status and the monitoring status for the port P11 respectively to "FWD" and "fault monitoring". On the occasion of receiving the second or subsequent LHCB frame, the monitoring status for the port P11 has already been changed to "fault monitoring". The processing of step S640 is accordingly performed to reset the monitoring timer for the port P11 to "0".

After the processing of either step S640 or step S650 in FIG. 13, the frame type identifier 41a notifies the destination search 42a of the receiving port (step S660). The destination search 42a then provides a discard instruction of the incoming frame and notification of the receiving port to the port status detector 44a (step S670).

After providing the discard instruction and the notification of the receiving port at step S670, the processing flow goes to step S410 in FIG. 11. Since the incoming frame is the LHCB frame (step S410: No), the processing flow proceeds to step S460. Unlike the processing flow on the occasion of receiving the LHC frame discussed above, the port status detector 44a receives the discard instruction and notification of the receiving port provided by the destination search 42a and thus provides the discard instruction and notification of the receiving port to the identification result generator 46a (step S460). The identification result generator 46a then provides a destination identification result including the discard instruction and the notification of the receiving port to the layer 2 controller 22a (step S470).

The processing flow then goes to steps S510 and S520 in FIG. 12. Since the analyzed destination identification result includes the discard instruction, the layer 2 controller 22a discards the incoming frame (LHCB frame) stored in a receive buffer (not shown: corresponding to the receive buffer 23b of the switch SW2 shown in FIG. 3) (step S530).

A3-3. Receiving General Frame

When the second switch SW2 receives a general frame, the processing flow of steps S210 to S240 shown in FIG. 9 is performed. When the frame type identifier 41b identifies that the frame type of the incoming frame is a "general frame" (step S240), the processing flow goes to FIG. 14 where the frame type identifier 41b notifies the destination search 42b of the destination MAC address included in the incoming frame (step S710).

The destination search 42b then searches the destination table 43b with the notified destination MAC address as the search key, and when no corresponding entry is found, registers a new entry in the destination table 43b (step S720). This series of processing is generally called "learning process".

The destination search 42b determines the output port, from which the incoming frame is to be relayed, based on the searched corresponding entry or the registered new entry at step S720 and notifies the port status detector 44b of the determined output port (step S730).

After determination and notification of the output port at step S730, the processing flow goes to step S410 in FIG. 11. Since the incoming frame is the general frame (step S410: Yes), the port status detector 44b searches the port status management table 45b with the notified output port as the search key to obtain the logical status for the notified output port (step S420). The port status detector 44b then determines whether the logical status for the notified output port is "BLK" (representing frame sending/receiving disabled) (step S430). When the logical status for the output port is "BLK", the port status detector 44b provides a discard instruction and notification of the receiving port to the identification result generator 46b (step S440). After providing the discard instruction and notification of the receiving port, the processing of step S470 in FIG. 11 and steps S510, S520, and S530 in FIG. 12 is performed in this sequence, as on the occasion of receiving the LHCB frame discussed above.

When the logical status for the output port is not "BLK" but is "FWD", on the other hand, the port status detector 44b notifies the identification result generator 46b of the output port (step S450). The identification result generator 46b then provides a destination identification result including the notified output port alone to the layer 2 controller 22b (step S470). The processing flow then goes to steps S510 and S520 in FIG. 12. Since it is determined that the analyzed destination identification result does not include the discard instruction at step S520 and does not include the return identifier change instruction at step S540, the layer 2 frame controller 22b sends or relays the incoming frame from the notified output port (step S560). Specifically, the layer 2 controller 22b duplicates the incoming frame stored in the receive buffer 23b, stores the duplicated frame into the send buffer 24b, and sends the duplicated frame from the notified output port via the layer 1 controller 21b.

A4. LHCB Frame Monitoring

Figure 15:
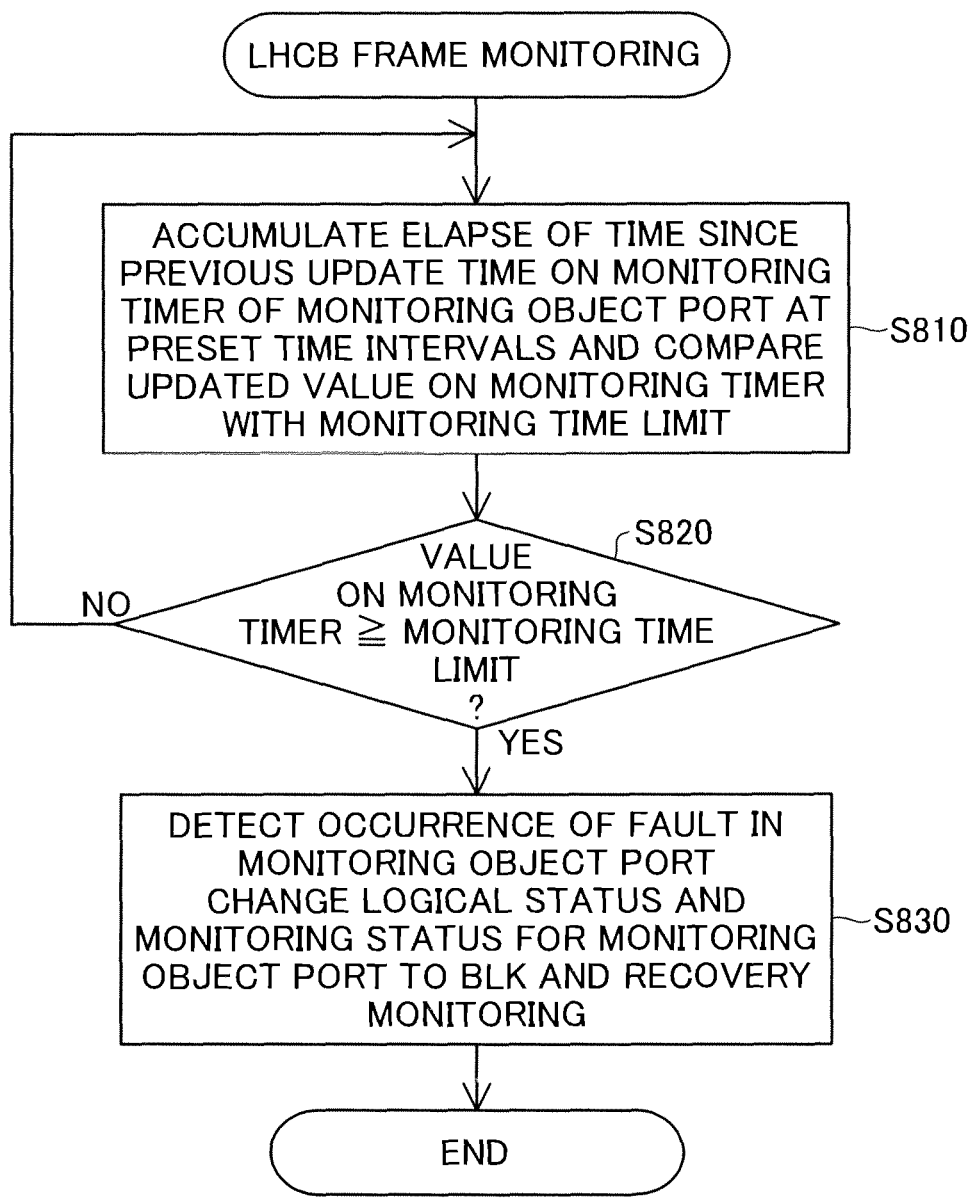
FIG. 15 is a flowchart showing the procedure of LHCB frame monitoring.

FIG. 15 is a flowchart showing the procedure of LHCB frame monitoring. The LHCB frame monitor 47a of the first switch SW1 receiving the instruction to start up LHCB frame monitoring initiates the procedure of LHCB frame monitoring in response to a change of the monitoring status for the monitoring object port from "recovery monitoring" to "fault monitoring". The monitoring status is changed, for example, on the occasion of receiving the first LHCB frame as discussed above.

The LHCB monitor 47a accumulates an elapse of time since the previous update time on the monitoring timer of the port corresponding to the monitoring object port in the port status management table 45a at preset time intervals and compares the updated value on the monitoring timer with the monitoring time limit (step S810). As discussed previously, when the port P11 of the first switch SW1 is set to the monitoring object port, the value in the monitoring timer field of the entry corresponding to the port P1 in the port status management table of FIG. 8 increments from 0 ms at the preset time intervals. The preset time interval is shorter than the monitoring time limit ("10 ms" for the port P11 in the illustrated example of FIG. 8).

The LHCB monitor 47a determines whether the value on the monitoring timer is not less than the monitoring time limit (step S820). The LHCB monitor 47a repeats the processing of steps S810 and S820 until the value on the monitoring timer reaches or exceeds the monitoring time limit. When the value on the monitoring timer reaches or exceeds the monitoring time limit (step S820: Yes), the LHCB monitor 47a detects the occurrence of a fault in the monitoring object port and changes the logical status and the monitoring status for the monitoring object port to "BLK" and "recovery monitoring" (step S830).

For example, when a failure on the physical link L212 causes the occurrence of a fault on the path PA12 as shown in FIG. 1, the LHC frame is not successfully relayed to the second switch SW2. In this case, the second switch SW2 does not send the LHCB frame to the first switch SW1, so that the monitoring timer corresponding to the port P11 is not reset to "0" (step S640 in FIG. 13). This leads to repetition of the processing of step S810 in FIG. 15 to increment the value on the monitoring timer of the port P11 as the monitoring object port to or over the monitoring time limit and results in detecting the occurrence of a path fault. The processing of step S830 is then performed to change the logical status for the monitoring object port to "BLK" (representing frame sending/receiving disabled).

Figures 16, 17:
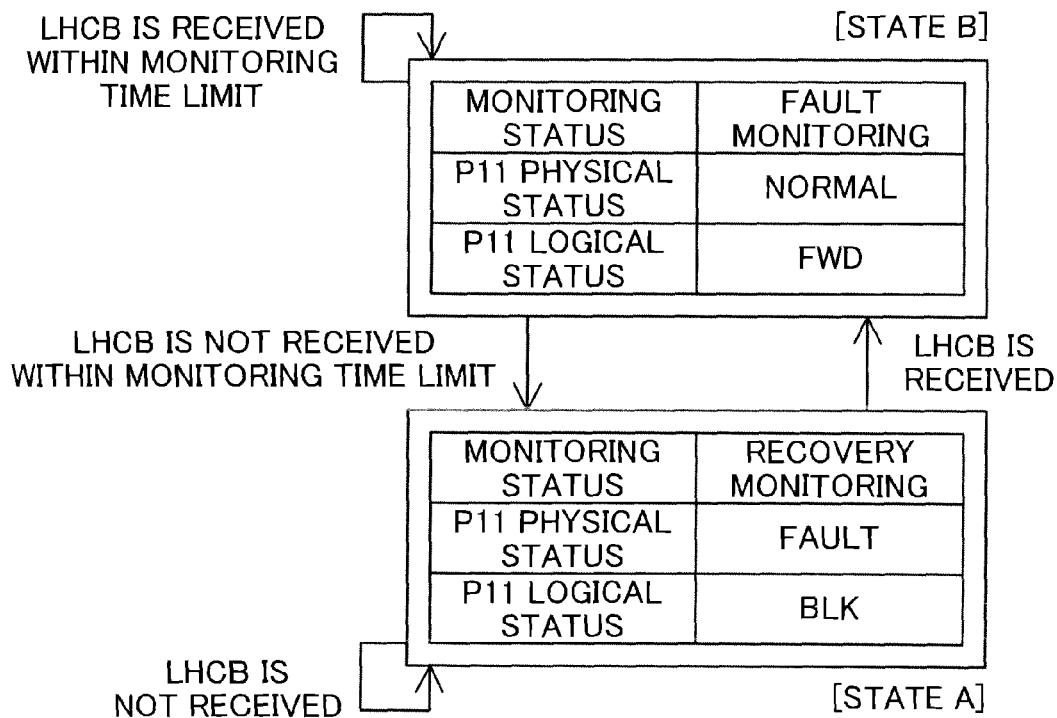
FIG. 16 is an explanatory diagram showing one example of the port status management table in the fault state having the occurrence of a path fault.
FIG. 17 is an explanatory diagram showing one example of state change of the monitoring status and the logical status of a port by LHCB frame monitoring.

FIG. 16 is an explanatory diagram showing one example of the port status management table in the fault state having the occurrence of a path fault. In the fault state that a fault occurs on the path PA12 as shown in FIG. 1, the occurrence of a path fault is detected when the incrementing value on the monitoring timer reaches or exceeds the monitoring time limit. In this state, the logical status and the monitoring status of the entry corresponding to the port P11 are respectively changed from "FWD" to "BLK" and from "fault monitoring" to "recovery monitoring" as shown in FIG. 16.

In this state, when the path fault is eliminated, the first switch SW1 receives the LHCB frame. The processing of step S650 in FIG. 13 is accordingly performed to change the logical status and the monitoring status of the entry corresponding to the port P11 to "FWD" and "fault monitoring".

FIG. 17 is an explanatory diagram showing one example of state change of the monitoring status and the logical status of a port by LHCB frame monitoring. The example of FIG. 17 shows the state change of the port P11 in the process of LHCB frame monitoring performed by the LHCB frame monitor 47a of the first switch SW1.

When the LHCB frame is not received at the port P11, it is determined that some fault occurs on either of the paths PA12 and PA21 connecting with the port P11. The physical status of the port P11 is accordingly determined as "fault". In this state, the monitoring status and the logical status for the port P11 are respectively set to "recovery monitoring" and "BLK" in the port status management table 45a. The port P11 accordingly falls into the frame sending/receiving disabled state. This state (referred to as "state A") is maintained until the LHCB frame is received.

When the LHCB frame is received in the state A, the physical status of the port P11 is determined as "normal". In this state, the monitoring status and the logical status for the port P11 are respectively changed to "fault monitoring" and "FWD" in the port status management table 45a. The port P11 accordingly falls into the frame sending/receiving enabled state. This state (referred to as "state B") is maintained while reception of the LHCB frame within the monitoring time limit is repeated.

When the LHCB frame is not received within the monitoring time limit in the state B, the state of the port P11 changes to the state A again to be in the frame sending/receiving disabled state.

The state of the monitoring object port can be changed automatically to the state A where the monitoring status is "recovery monitoring" or to the state B where the monitoring status is "fault monitoring" by monitoring the reception of the LHCB frame as the return of the transmitted LHC frame. This results in automatically cutting off or blocking the monitoring object port on the occurrence of unidirectional path fault and automatically recovering the monitoring object port when the path fault is eliminated.

As described above, when the switch (second switch SW2) terminating the monitoring object path receives the LHC frame, the network system 100 of the embodiment generates the LHCB frame by simply exchanging the destination MAC address in the incoming frame for a source MAC address and the source MAC address in the incoming frame for a destination MAC address and changing the setting of the return identifier in the incoming frame. This enables the hardware processing by the layer 2 controller 22b and speeds up the processing. The occurrence of a unidirectional path fault between the two switches SW1 and SW2 is thus detectable in a short time period.

The LHC frame and the LHCB frame have the layer 2 header format similar to that of the general frame. In the structure including the third switch SW3 located between the first switch SW1 and the second switch SW2, the LHC frame and the LHCB frame, as well as the general frame is relayed through the third switch SW3. The monitoring object switch can accordingly be monitored via another switch that is not the monitoring object. This arrangement enables the occurrence of a path fault to be monitored in a relatively large-scaled system.

When the LHCB frame is received within the monitoring time limit, the first switch SW1 determines that all the links are normal and sets the logical status of the port P11 to the "frame sending/receiving enabled" state (FWD). When the LHCB frame is not received within the monitoring time limit, on the other hand, the first switch SW1 determines that a failure occurs on at least one of the links and sets the logical status of the port P11 to the "frame sending/receiving disabled" state (BLK). The network system 100 of the embodiment can accordingly detect the occurrence of a path fault on at least one of the paths PA12 and PA21 connecting with the port P11 and cut off the frame sending/receiving by the port P11.

The conventional UDLD (unidirectional link detection) adopts the software configuration to analyze various parameters included in an incoming frame and detect the occurrence of a link fault based on the result of the analysis. This arrangement has the problem of undesirably long time required for fault detection. The path fault detection of this embodiment, on the other hand, detects the occurrence of a link fault, based on whether the LHCB frame as the return of the transmitted LHC frame is received within the monitoring time limit. The type of the incoming frame is readily identifiable as the general frame or as either of the LHC frame and the LHCB frame, based on the destination MAC address. The path fault detection of this embodiment thus preferably shortens the time period required for path fault detection, compared with the conventional UDLD. The path fault detection of this embodiment can shorten the time period required for, in response to the occurrence of a path fault, cutting off the port involved in the path fault and changing over the path from the fault path to a normal path.

When the path fault is eliminated, the first switch SW1 resumes receiving the LHCB frame within the monitoring time limit. This automatically changes the logical status of the port terminating the path with the fault from the "frame sending/receiving disabled" state (BLK) to the "frame sending/receiving enabled" state (FWD) and thereby automatically resumes path fault monitoring.

B. Modifications

The invention is not limited to any of the embodiment and the applications discussed above but may be actualized in diversity of other embodiments and applications within the scope of the invention. Some examples of possible modification are given below.

B1. Modification 1

In the embodiment discussed above, the first switch SW1 is set as the monitoring entity that performs monitoring, while the second switch SW2 is set as the monitoring object. The present invention is, however, not restricted to such settings. The system configuration may be modified to set each switch both as the monitoring entity and as the monitoring object. In this modified system configuration, each of the switches SW1 and SW2 can make discrimination between the LHC frame and the LHCB frame based on the settings of the return identifier and thereby monitor the occurrence of a path fault. For example, when the sender of an incoming frame is the second switch SW2, the first switch SW1 identifies the type of the incoming frame as the LHCB frame or as the LHC frame, based on the setting of the return identifier in the incoming frame. The first switch SW1 changes over the series of processing to be performed according to the identified frame type. When the incoming frame is the LHC frame, the first switch SW1 sends the LHCB frame to the second switch SW2. When the incoming frame is the LHCB frame, the first switch SW1 discards the incoming frame.

B2. Modification 2

The above embodiment uses the two different types of frames (LHC frame and LHCB frame) for monitoring the occurrence of a path fault. The system configuration may be modified to use only one type of frame for monitoring the occurrence of a path fault. One concrete example of such modified system configuration is explained. The first switch SW1 may send an LHC frame according to the procedure of the embodiment discussed above. When receiving the LHC frame from the first switch SW1, the second switch SW2 may generate a return LHC frame by exchanging the destination MAC address in the incoming LHC frame for a source MAC address and the source MAC address in the incoming LHC frame for a destination MAC address and send back the generated return LHC frame to the first switch SW1.

In this modified system configuration, on the occasion of not receiving any LHC frame in a preset time period, the first switch SW1 detects the occurrence of a path fault either on the path PA12 or on the path PA21. This modified system configuration generates a return frame by only exchanging the destination MAC address in the incoming frame for a source MAC address and the source MAC address in the incoming frame for a destination MAC address but not changing the setting of the return identifier in the incoming frame and thus enables the return frame to be sent back within a shorter time period. This modified system configuration accordingly ensures detection of a unidirectional path fault between the two switches SW1 and SW2 in a shorter time period.

In this modified system configuration, each of the two switches SW1 and SW2 is not allowed to set the other switch SW2 or SW1 as the monitoring object to monitor the occurrence of a path fault. For example, when receiving an LHC frame, the first switch SW1 is not able to identify whether the incoming LHC frame is a return frame sent back from the second switch SW2 in response to an LHC frame sent by the first switch SW1 or a frame newly sent from the second switch SW2 to the first switch SW1. In this modified system configuration, however, when receiving an LHC frame, the first switch SW1 can detect at least no occurrence of a fault on the path PA21 from the second switch SW2 to the first switch SW1.

B3. Modification 3

In the system configuration of the above embodiment, the network system 100 includes the three switches. The network system 100 may be configured to include any arbitrary number of switches including at least two layer 2 switches according to the present invention. The network system 100 generates an LHCB frame by changing the settings of only a destination address and a source address included in a header field of an incoming LHC frame. In the network system configuration having a plurality of switches provided between the first switch SW1 and the second switch SW2, each of the plurality of switches is configured to relay an LHCB frame, as well as a general frame, toward the first switch SW1. In the network system 100 configured as a large-scaled network system, each of the layer 2 switches of the invention can monitor the occurrence of a path fault. In another modified system configuration including an additional layer 2 switch provided between the first switch SW1 and the second switch SW2, each of the layer 2 switches according to the present invention can monitor the occurrence of a path fault between the first switch SW1 and the second switch SW2.

In another modified system configuration including any arbitrary number of switches including at least three layer 2 switches according to the present invention, two or more layer 2 switches may be set simultaneously as the monitoring entities. When the multiple switches set as the monitoring entities monitor the occurrence of a fault on a path to an identical switch set as the monitoring object, the monitoring object switch can send back LHCB frames to the multiple switches without requiring any complicated management. This is because the LHCB frame is generated by simply exchanging the destination MAC address in the incoming LHC frame for a source MAC address and the source MAC address in the incoming LHC frame for a destination MAC address and changing the setting of the return identifier in the incoming LHC frame. The monitoring object switch is thus not required to have pre-registration of switches as potential destinations of LHCB frames. This arrangement preferably relieves the user's operations required for monitoring the occurrence of a path fault.

B4. Modification 4

The system configuration of the embodiment monitors the occurrence of a path fault between two switches. The technique of the present invention is, however, not restricted to this system configuration but is applicable to monitor the occurrence of a layer 2 path fault between a server and a storage, for example, a NAS (network-attached storage). In this modified system configuration, the functional blocks included in the two switches SW1 and SW2 are to be incorporated in the server and the storage. The technique of the present invention is also applicable to monitor the occurrence of a layer 2 path fault between a server and a client, for example, a personal computer. As clearly understood from the description of the embodiment and these modified examples, the network system of the present invention may include any communication devices that are capable of establishing layer 2 communication.

B5. Modification 5

In the system configuration of the above embodiment, all the three switches SW1 to SW3 are layer 2 switches. All the three switches SW1 to SW3 may alternatively be layer 3 switches. In this modified system configuration, an LHCB frame (packet) is generated by simply exchanging the layer 3 destination address in an incoming frame (packet) for a layer 3 source address and the layer 3 source address in the incoming frame for a layer 3 destination address and changing the setting of the return identifier included in the data field of the layer 3 frame format of the incoming frame. This procedure is easily achievable by the hardware processing. This modified system configuration accordingly enables high-speed processing for monitoring the occurrence of a path fault, like the system configuration of the above embodiment.

B6. Modification 6

In the system configuration of the above embodiment, the interface provided to the user for monitoring the occurrence of a path fault is the graphical interface as shown in FIGS. 4 and 5. The graphical interface may be replaced by an interface configured to input commands from a command line.

In the system configuration of the above embodiment, the management terminals PC1 and PC2 are respectively connected with the two switches SW1 and SW2 for the purpose of monitoring the occurrence of a path fault. This system configuration is, however, neither essential nor restrictive. In one modified system configuration, each of the two switches SW1 and SW2 may have an operation panel provided in the casing. The user operates the operation panel to make various settings (for example, setting the monitoring object port and the frame sending/receiving interval). In another modified system configuration, a management terminal (e.g., personal computer) connected with the third switch SW3 may send intended setting information to the two switches SW1 and SW2 via a network to set the intended setting information into the respective switches SW1 and SW2. In another modified system configuration, the user's settings may not be allowed for but the default settings may be used for the settings in a switch as the monitoring entity (i.e., the settings of the first switch SW1 as the monitoring entity in the embodiment). Like the embodiment discussed above, the user's settings are allowed for the frame-return settings in a switch as the monitoring object (i.e., the settings of the second switch SW2 as the monitoring object switch in the embodiment). In general, the network system of the present invention may have arbitrary system configuration including a user interface configured to set approval or non-approval of generation and transmission of a monitoring-response frame by a second communication device.

B7. Modification 7

In the system configuration of the above embodiment, the destination MAC address is used for discrimination between the general frame and the non-general frame (i.e., LHC frame or LHCB frame). This arrangement is, however, neither essential nor restrictive. For example, the setting in a type field of the layer 2 header field may be used for such discrimination. In this modified system configuration, it is preferable to set in advance different values from that of the general frame for the LHC frame and the LHCB frame. In the network system 100 capable of setting VLAN (Virtual LAN), different VLAN IDs may be set for sending/receiving general frames, sending/receiving LHC frames, and sending/receiving LHCB frames. The frame type of each incoming frame is then identifiable by checking the VLAN ID set in the incoming frame.

B8. Modification 8

In the system configuration of the above embodiment, in response to reception of the LHCB frame within the monitoring time limit, the state of a port is automatically changed from the state A representing the "recovery monitoring" status to the state B representing the "fault monitoring" status. This arrangement is, however, neither essential nor restrictive. In one modified system configuration, in response to reception of the LHCB frame within the monitoring time limit, the state of a port may be changed from the state A to an intermediate state representing the "stand-by status" waiting for the user's instruction and, in response to the user's recovery command, may be changed from the intermediate state to the state B.

What is claimed is:
1. A network system, comprising:
   a first communication device being set up with a first address and configured to transmit and receive a frame via a port; and
   a second communication device connected with the first communication device using a network and being set up with a second address and configured to transmit and receive a frame using a port;
   a management device configured to select an object to be monitored, including a communication device and a port, and to set a time interval of transmitting of a monitor frame between the communication devices and to set a monitoring time limit using the monitor frame;
   wherein the first communication device includes:
      a monitor frame transmitter configured to, when the second communication device and a port of the first communication device are selected as an object to be monitored by the management device, generate a monitor frame including the second address as a destination address and the first address as a source address, and to output the generated monitor frame on the selected port to the network according to the time interval and the time limit;
      a monitoring-response frame monitor configured to, when a port of the first communication device is selected as an object to be monitored by the management device, monitor reception of a monitoring-response frame sent back on the selected port from the second communication device according to the time limit;
      a port configured to, when the port of the first communication device is selected as an object to be monitored by the management device, send the monitor frame using a first physical link and receive the monitoring-response frame using a second physical link; and
      a port controller configured to set a frame sending/receiving-enabled state as a logical status of the port on a basis of reception status of the monitoring-response frame monitored by the monitoring-response frame monitor; and
   wherein the second communication device includes:
      a monitoring-response frame transmitter configured to, in response to reception of the monitor frame, generate the monitoring-response frame by exchanging the destination address in the received monitor frame for a source address and the source address in the received monitor frame for a destination address, and output the generated monitoring-response frame to the network, when the second communication device and a port of the first communication device are selected as an object to be monitored by the management device.
2. The network system in accordance with claim 1, wherein the second communication device further includes:
   a receive buffer configured to store the received monitor frame; and
   a send buffer configured to store the generated monitoring-response frame, and
   wherein the monitoring-response frame transmitter is configured to read out the destination address from the monitor frame stored in the receive buffer and to record the read-out destination address as the source address of the monitoring-response frame stored in the send buffer, while reading out the source address from the monitor frame stored in the receive buffer and recording the read-out source address as the destination address of the monitoring-response frame stored in the send buffer.

3. The network system in accordance with claim 1,
wherein the port controller is configured to set the frame sending/receiving-enabled state as the logical status of the port when the monitoring-response frame monitor detects reception of the monitoring-response frame at the port, and to set a frame sending/receiving-disabled state as the logical status of the port when the monitoring-response frame monitor does not detect reception of the monitoring-response frame at the port, according to the time interval and the time limit set by the management device.

4. The network system in accordance with claim 1, wherein the monitor frame transmitter is configured to set a monitor frame identifier representing identification of the monitor frame, as part of the monitor frame, and
in generating the monitoring-response frame, the monitoring-response frame transmitter is configured to change the monitor frame identifier set in the monitor frame to a monitoring-response frame identifier representing identification of the monitoring-response frame.

5. The network system in accordance with claim 1, wherein the monitoring-response frame transmitter is configured to generate the monitoring-response frame by changing only the destination address and the source address in the monitor frame.

6. The network system in accordance with claim 1, wherein both the first communication device and the second communication device are layer 2 switches.

7. The network system in accordance with claim 1,
wherein the port controller is configured to set the frame sending/receiving-enabled state as the logical status of the port when the monitoring-response frame monitor detects reception of the monitoring-response frame at the port, and to set a frame sending/receiving-disabled stated as the logical status of the port when the monitoring-response frame monitor does not detect reception of the monitoring-response frame at the port,
wherein the second communication device further includes:
a receive buffer configured to store the received monitor frame; and
a send buffer configured to store the generated monitoring-response frame, and
wherein the monitoring-response frame transmitter is configured to read out the destination address from the monitor frame stored in the receive buffer and to record the read-out destination address as the source address of the monitoring-response frame stored in the send buffer, while reading out the source address from the monitor frame stored in the receive buffer and recording the read-out source address as the destination address of the monitoring-response frame stored in the send buffer.

8. The network system in accordance with claim 1,
wherein the port controller is configured to set the frame sending/receiving-enabled state as the logical status of the port when the monitoring-response frame monitor detects reception of the monitoring-response frame at the port, and to set a frame sending/receiving-disabled stated as the logical status of the port when the monitoring-response frame monitor does not detect reception of the monitoring-response frame at the port,
wherein the second communication device further includes:
a receive buffer configured to store the received monitor frame; and
a send buffer configured to store the generated monitoring-response frame,
wherein the monitoring-response frame transmitter is configured to read out the destination address from the monitor frame stored in the receive buffer and to record the read-out destination address as the source address of the monitoring-response frame stored in the send buffer, while reading out the source address from the monitor frame stored in the receive buffer and recording the read-out source address as the destination address of the monitoring-response frame stored in the send buffer,
wherein the monitor frame transmitter is configured to set a monitor frame identifier representing identification of the monitor frame, as part of the monitor frame, and
wherein in generating the monitoring-response frame, the monitoring-response frame transmitter is configured to change the monitor frame identifier set in the monitor frame to a monitoring-response frame identifier representing identification of the monitoring-response frame.

9. The network system in accordance with claim 1,
wherein the port controller is configured to set the frame sending/receiving-enabled state as the logical status of the port when the monitoring-response frame monitor detects reception of the monitoring-response frame at the port, and to set a frame sending/receiving-disabled state as the logical status of the port when the monitoring-response frame monitor does not detect reception of the monitoring-response frame at the port,
wherein the second communication device further includes:
a receive buffer configured to store the received monitor frame; and
a send buffer configured to store the generated monitoring-response frame,
wherein the monitoring-response frame transmitter is configured to read out the destination address from the monitor frame stored in the receive buffer and to record the read-out destination address as the source address of the monitoring-response frame stored in the send buffer, while reading out the source address from the monitor frame stored in the receive buffer and recording the read-out source address as the destination address of the monitoring-response frame stored in the send buffer, and
wherein the monitoring-response frame transmitter is configured to generate the monitoring-response frame by changing only the destination address and the source address in the monitor frame.

10. The network system in accordance with claim 1,
wherein the port controller is configured to set the frame sending/receiving-enabled state as the logical status of the port when the monitoring-response frame monitor detects reception of the monitoring-response frame at the port, and to set a frame sending/receiving-disabled state as the logical status of the port when the monitoring-response frame monitor does not detect reception of the monitoring-response frame at the port; and
wherein the second communication device further includes:
a receive buffer configured to store the received monitor frame; and
a send buffer configured to store the generated monitoring-response frame,
wherein the monitoring-response frame transmitter is configured to read out the destination address from the monitor frame stored in the receive buffer and to record the read-out destination address as the source address of the monitoring-response frame stored in the send buffer, while reading out the source address from the monitor frame stored in the receive buffer and recording the read-out source address as the destination address of the monitoring-response frame stored in the send buffer, wherein the monitor frame transmitter is configured to set a monitor frame identifier representing identification of the monitor frame, as part of the monitor frame, wherein in generating the monitoring-response frame, the monitoring-response frame transmitter is configured to change the monitor frame identifier set in the monitor frame to a monitoring-response frame identifier representing identification of the monitoring-response frame, and wherein both the first communication device and the second communication device are layer 2 switches.

11. The network system in accordance with claim 1, wherein the port controller is configured to set the frame sending/receiving-enabled state as the logical status of the port when the monitoring-response frame monitor detects reception of the monitoring-response frame at the port, and to set a frame sending/receiving-disabled stated as the logical status of the port when the monitoring-response frame monitor does not detect reception of the monitoring-response frame at the port; and wherein the second communication device further includes:

a receive buffer configured to store the received monitor frame; and a send buffer configured to store the generated monitoring-response frame, wherein the monitoring-response frame transmitter is configured to read out the destination address from the monitor frame stored in the receive buffer and to record the read-out destination address as the source address of the monitoring-response frame stored in the send buffer, while reading out the source address from the monitor frame stored in the receive buffer and recording the read-out source address as the destination address of the monitoring-response frame stored in the send buffer, wherein the monitoring-response frame transmitter is configured to generate the monitoring-response frame by changing only the destination address and the source address in the monitor frame, and wherein both the first communication device and the second communication device are layer 2 switches.

12. A layer 2 switch being set up with a second address and connected with a communication device being set up with a first address using a network, comprising:

a management interface configured to be coupled to a management device that is configured to select an object to be monitored, including a layer 2 switch and a port, and that is configured to set a time interval of transmitting of a monitor frame between the communication devices and that is configured to set a monitoring time limit using the monitor frame;

a plurality of ports configured to send the monitor frame using a first physical link and to receive and send monitoring-response frame using the second physical link;

a monitoring-response frame transmitter configured to, when the layer 2 switch is selected to be monitored by the management device, in response to reception of a monitor frame that is a layer 2 frame including the second address as a destination address and the first address as a source address, generate a monitoring-response frame by exchanging the destination address in the received monitor frame for a source address and the source address in the received monitor frame for a destination address, and output, using a first port, the generated monitoring-response frame to the network;

a monitor frame transmitter configured to, when the port is selected to be monitored by the management device, generate a monitor frame including a destination address corresponding to the selected other layer 2 switch by the management device and a source address, and to output using a second port the generated monitor frame to the network; and a monitoring-response frame monitor configured to, when the port is selected to be monitored by the management device, monitor reception of a monitoring-response frame sent back from another communication device according to the time limit and time interval set by the management device; and a port controller configured to set a frame sending/receiving-enabled state as a logical status of the port on a basis of reception status of the monitoring-response frame monitored by the monitoring-response frame monitor;

wherein a monitor frame is relayed between other layer 2 switches when the layer 2 switch is not selected to be monitored.

13. A method of detecting occurrence of a fault in a network connecting a first communication device being set up with a first address and a second communication device being set up with a second address, the method comprising the steps of:

by a management device, selecting an object to be monitored, including a communication device and a port, and setting a time interval of transmitting of a monitor frame between the communication devices and setting a monitoring time limit using the monitor frame;

by the first communication device, when a port of the first communication device is selected to be monitored, generating a monitor frame including the second address as a destination address and the first address as a source address, and outputting using a first physical link the generated monitor frame to the network;

in response to reception of the monitor frame, by the second communication device, when the second communication device is selected to be monitored, generating a monitoring-response frame by exchanging the destination address in the received monitor frame for a source address and the source address in the received monitor frame for a destination address, and outputting the generated monitoring-response frame to the network; and by the first communication device, monitoring reception of the monitoring-response frame output from the second communication device using a second physical link when a port of the first communication device is selected to be monitored; and by the first communication device, setting a frame sending/receiving-enabled state as a logical status of the port on a basis of reception status of the monitoring-response frame as a result of the monitoring step.

* * * * *